(12) United States Patent  
Junkin

(10) Patent No.: US 6,493,717 B1
(45) Date of Patent: *Dec. 10, 2002

(54) SYSTEM AND METHOD FOR MANAGING DATABASE INFORMATION

(75) Inventor: Joseph R. Junkin, Weston, MA (US)

(73) Assignee: DataFree, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/334,106

(22) Filed: Jun. 16, 1999

Related U.S. Application Data

(60) Provisional application No. 60/089,494, filed on Jun. 16, 1998.

(51) Int. Cl.[7] .............................................. G06F 17/30
(52) U.S. Cl. .......................................... 707/102; 707/4
(58) Field of Search .......................... 707/3–4, 5, 101, 707/102, 103, 104, 202, 206, 501, 503; 709/203, 217, 223, 303

(56) References Cited

U.S. PATENT DOCUMENTS

| | | | | |
|---|---|---|---|---|
| 6,182,085 B1 | * | 1/2001 | Eichstaedt et al. | 707/104 |
| 6,185,553 B1 | * | 2/2001 | Byrd et al. | 707/3 |
| 6,230,168 B1 | * | 5/2001 | Unger et al. | 707/501 |
| 6,233,620 B1 | * | 5/2001 | Gish | 709/303 |

\* cited by examiner

*Primary Examiner*—Diane D. Mizrahi
(74) *Attorney, Agent, or Firm*—Hale and Dorr LLP

(57) ABSTRACT

A system and method is provided for managing database information to be presented in HTML format for retrieval and display by a Web browser. Database information is managed by responding to a user selection delivered by browser software by retrieving the contents of portions of a database and constructing an HTML-compatible presentation of the contents in accordance with definitions that hierarchically link the portions separately from any database-provided links between the portions.

27 Claims, 26 Drawing Sheets

Microfiche Appendix Included
(3 Microfiche, 261 Pages)

⌁100

📁 Products New
| 84 records
├─ ○  Charlie
├─ ○  Rasion
├─ ○  Shucks Syrup
├─ ○  Fiery red Pepper
├─ ○  Devil Heat
├─ ○  White Bread

FIG. 2

| Save | Delete | New | Browse |

Path: Category : Sweets

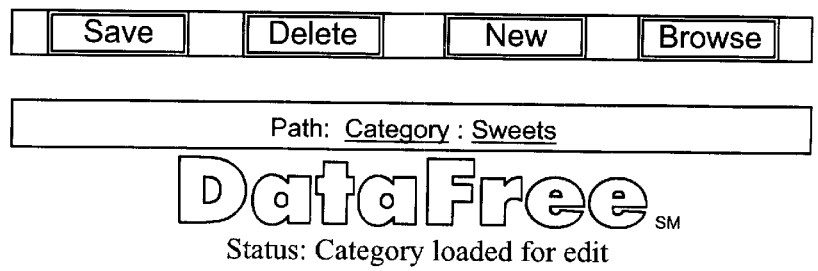
Status: Category loaded for edit

200

Food Category: Food Categories help to group common foods together

Category | Sweets |
The Name of the category

Description | Cakes and Pies |
Detailed description of this category

FIG. 3

```
              ┌400
   ┌─┐
   └─┘ Category New
      ├─┼─┤ Beverages
      ├─┼─┤ Seasonings
      ├─┼─┤ Sweets
      ├─┼─┤ Dairy
      ├─┼─┤ Breads And Grains
      ├─┼─┤ Meats
      ├─┼─┤ Veggies And Fruits
      └─┼─┤ Fish and seafood
```

```
              ┌500
   ┌─┐
   └─┘ Category New
      ├─┼─┤ Beverages
      ├─┼─┤ Seasonings
      ├─┼─┤ Sweets
      ├─┼─┤ Dairy
      ├─┼─┤ Breads And Grains
      ├─┼─┤ Meats
      ├─┼─┤ Veggies And Fruits
      └─┼─┤ Fish and seafood
```

*ACTION='CS' (CONTRACT SOURCE)*

CLOSED FOLDER ─ ☐ Category New
ICON IS
DISPLAYED
          ALL RECORDS HAVE
          BEEN HIDDEN

FIG. 9

*ACTION='ER' (EXPAND RECORD)*

📂 Category New

*A*
THE 'SWEETS' RECORD   ⊞ Beverages
HAS BEEN EXPANDED   ⊞ Seasonings         *B*
AND THE CONTRACT ── ⊟ Sweets         THE PRODUCT NODE
RECORD ICON IS       ┗📂 Product New   IS DISPLAYED AND
DISPLAYED           ┝ ○ Butterscotch   THE DEFAULT ACTION
                ┝ ○ Bubble Gum    IS EXPAND SOURCE
*C*
ALL PRODUCTS         ┝ ○ Barnes Chocolate
RELATED TO THE      ┝ ○ Biscuits
CATEGORY 'SWEETS'    ┝ ○ Red Hots
ARE DISPLAYED        ┝ ○ Caramels
                ┝ ○ Dark Chocolate
                ┝ ○ Ole snark
                ┝ ○ Oak Gum
                ┝ ○ Rick's Taffy
                ┝ ○ Elkona
                ┝ ○ Salsbury Tart
                ┗ ○ Yak Lilly
     ⊞ Dairy
     ⊞ Breads And Grains
     ⊞ Meats

FIG. 10

╔═ Customer Order New ╔═ 1700
| 14 records
├⊞ Senn Arak
├⊞ Sippen Skia
├⊞ Shilly Sound
├⊞ Spainish Market
├⊞ South Of The Border
├⊞ Seven Season
├⊞ Sally Simpson's
├⊞ Sandrine
├⊞ Sinny Sel Sant
├⊞ Store 23
├⊞ Sals Restaurant
├⊞ Sons Corporation
├⊞ Samon Fils
└⊞ Sam Rodd, Inc.

○ No Lookup This option signifies that 'Lookup' functionality is not active

⦿ Lookup Data Source This option defines another Data Source (external to this Data Source) in which value(s) will be 'Looked Up' or fetched and displayed within this field according to how it is formatted.

Lookup Source ? [Category ▼]
The data source used for the lookup.

Key Field ? [Primary Key ▼]
The Key Field should be a unique value from the lo source. It is this value that will actually be set when chooses a value from the list.

Display Field ? [Category ▼]
The field from the lookup source that will be display

THE FIELD LABEL    THE FIELD IS FORMATTED AS A TEXT BOX WITH A VALUE OF '6'

Sort Order ? [6]
Defines the sort order of the field within the group.

OPTIONAL HELP LINK    TEXT PLACED AFTER THE FIELD

FIG. 26

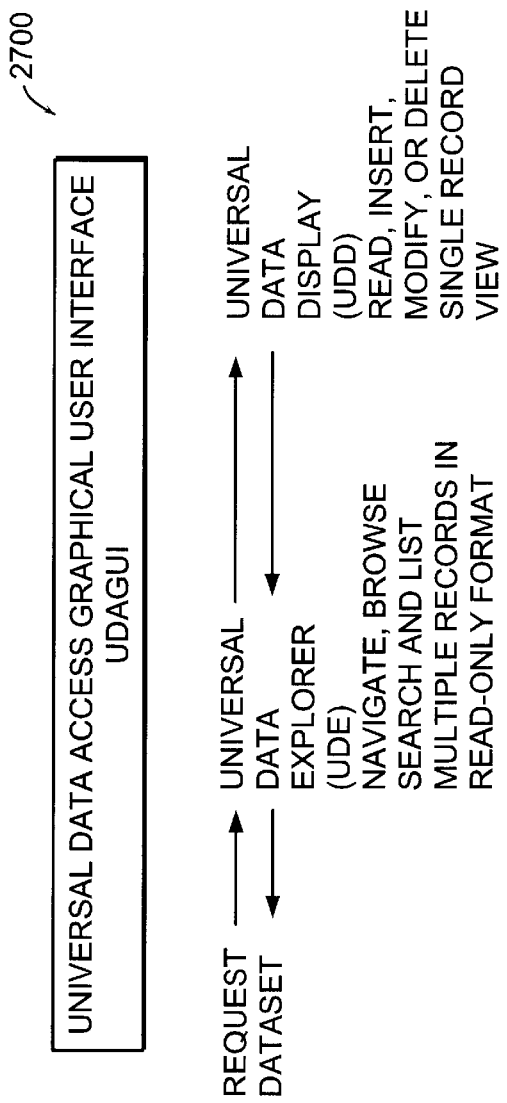

FIG. 35

SYSTEM AND METHOD FOR MANAGING DATABASE INFORMATION

CROSS-REFERENCE TO RELATED APPLICATIONS

This application claims the benefit of U.S. Provisional Application Ser. No. 60/089,494 entitled "Administration Interface for Web-Based Databases" filed on Jun. 16, 1998, which is incorporated herein.

MICROFICHE APPENDIX

A Source Code Appendix containing computer source code is attached and is incorporated herein. The Source Code Appendix comprises 261 frames on 3 sheets of microfiche.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to systems and methods for managing database information. More specifically, the present invention relates to systems and methods for managing database information to be presented in hypertext format.

BACKGROUND OF THE INVENTION

Present day database systems are known to be used for storing information for many purposes. For example, retail stores use database systems to store inventory and pricing information, and airlines use these systems to store flight and passenger information. Information in a database system typically is stored in such a way that it may be readily retrieved and displayed on a computer display screen. The format in which it is displayed generally is determined by the application software running on a local computer. This application software interacts with the database system, which actually may be located across a computer network, to retrieve the pieces of information that are to be displayed on the display screen, and then appropriately composes the information so that it may be displayed in a desired way on the display screen.

Viewer software, which is commonly called a Web Browser, is used to request, retrieve, and display information stored on a computer that is in some way connected across a network that, for example, uses World-Wide Web and Internet protocols.

The requested information that is retrieved is delivered to the Web browser in a format known as Hypertext Markup Language ("HTML"). The HTML instructs the Web browser how to arrange the information on a computer display. A Web server that sends the requested information across the computer network is responsible for producing such HTML formatted information.

In some cases, the HTML formatted information is stored in a fixed or static form: the information may be a newspaper article. In other cases, at least a portion of the HTML formatted information is produced dynamically at the time the Web server receives a request from a Web browser: the information may be an up-to-date stock quote.

The HTML formatted information may include information retrieved from a database system, as has been previously mentioned. If the HTML formatted information is to include hierarchically organized information, such as a chart showing food items by category (e.g., milk and cream under dairy, and apples and oranges under fruit), the Web server relies on a fixed hierarchy that is embedded in the database system. For instance, if the database system hierarchically organizes beef, chicken, and fish under meat, the HTML formatted information that is provided by the Web server will also show that beef, chicken, and fish are included in a meat category and in the order shown: starting with beef followed by chicken followed by fish.

To effectively manage the contents of the database system and the hierarchy imposed by the database system, a human manager must use a database management application program that may be running on a local computer or may be running on a computer connected across a network. Similarly, if a human user wishes to effectively interact with the contents of the database system, he or she must use a sophisticated application program that is provided for that purpose. This program, among other things, will permit manipulation of the hierarchy. A human manager or human user that is equipped solely with a Web browser has severely limited capabilities for effecting changes with respect to database systems. As a result, database management cannot be provided on a worldwide, universal basis by means of the World-Wide Web or Internet and Web browsers.

Accordingly, there is a need for a system and method for managing database information to be presented in HTML format for retrieval and display.

SUMMARY OF THE INVENTION

The system and method of the present invention permits the management of database information using Web browser. The Web browser will be utilized by the user to make selections that are to be delivered by browser software for retrieving portions of a database and constructing an HTML-compatible presentation of these portions. The present invention will be in accordance with the definitions that hierarchically link these portions separately from any database-provided links between the portions.

The present invention provides the ability to create, share and manage structured database information on the Internet. The present invention simplifies and more efficiently enables the administration and utilization of Internet-based database information repositories. Among other things, the present invention overcomes many of these problems that exist in the management of structured database information within the confines of the HTML environment as they exist today. As such, the present invention allows individuals, groups and organizations worldwide to communally build, manage and navigate large amounts of interrelated web-based structured information. The present invention provides online service and effectively has groups of individuals sharing common interests to build structured database information using only a standard HTML web browser. According to the present invention, the system is capable of harboring content that permits that tracking user interests and activities for marketing or other purposes without the need to violate user privacy.

The present invention provides a DataCrawler system. This system furnishes a pre-built framework for web database applications that browse and edit database information directly using an HTML-based Internet browser. The DataCrawler system has a turn-key application environment that provides powerful navigation and editing functionality. The system is a comprehensive database exploration and data entry/collection system with integrated administration, application and security management. The barrier to creating and maintaining an HTML web site is typically high in terms of cost and technological expertise. This means that the majority of individuals do not have the capability to provide web content. Further, the HTML model provides limited security options for communal contribution of content. The DataCrawler sub-system has a reusable component based technology that provides a universal methodology for exploring and editing database information. The system combines the flexibility to administer customized interrelated database storage with the low maintenance overhead of a structured, pre-built interface.

The system of the present invention can be used to create a leading repository of Internet-based structured database information. As such, the system of the present invention can become the portal for the Internet community to interact with an expanding resource of valuable information. Continuous Internet traffic can be attracted that is interested in browsing or contributing to structured database repositories hosted by the service. Interface and information can then combine together to retain each individual for effectively as long a period as possible.

The present invention will permit a user to use the system while dynamic banner advertising, is displayed at strategic locations on each screen. Users may simultaneously participate in the communal building of on-line content by sharing information through the system.

Audiences can be provided with databases administered by the service directly. These databases can be the more market valuable information sources that it is desirable to carefully control.

The system and method of the present invention also permit controlled access to structured information repositories. This will result in the system being capable of holding powerful tools that allow precisely targeted, real-time advertising. At any predetermined time during a user session, the system of the present invention will have access to: the identity of operator, the path that precisely details the information being assessed at that moment, as well as past and current session history. This information may be gathered in a non-intrusive manner without the need to actually identify the operator. Due to the nature of the system providing access to structured information, it is easy to categorize what each user is interested in at any moment in time in a non-intrusive manner. Detailed logging of session information allows the service to track and classify usage. More or less information can be saved depending on the potential marketing value of the database.

The DataCrawler system includes a web application server that provides a pre-built framework for building dynamic HTML applications for browsing and editing database information. The system provides a simplified and structured graphical user interface to permit individuals to create HTML content using only a standard Internet browser. The DataCrawler system has a 100% HTML based interface that gives the system flexibility with respect to changing technologies.

The DataCrawler system uses a plug and play setup process to set up and configure it. The DataCrawler system does not require programming to manage the user interface or access database information.

The DataCrawler system permits customized data management including the ability to dynamically access and edit information within complex interrelated data sets. The DataCrawler system provides a centralized database application engine that can operate on a very large number of web database applications with a very large number of users.

The DataCrawler system includes a Web application server program operating through a Web server. The system program provides dynamic HTML web pages for each user request. In one specific embodiment, the web application server program is written in high level object-oriented Perl code.

The DataCrawler system may include two interfaces:
1. A secure end-user application that allows the operator to browse, navigate, search and edit information contained within one or more centralized databases.
2. A complete and secure administration facility for creating, deploying and maintaining the secure end-user applications.

The DataCrawler system may include a standardized interface being capable of utilizing relational/linked data, separate administration and end-user access, easily configurable access to database views as anonymous or authenticated users, full editing (Insert, Update and Delete) capabilities, integrated security and session management, self-administration by designated individual(s) from the group and all of the functionality performed using a standard HTML browser.

As previously mentioned, a key to the DataCrawler system is reusable technology that provides a universal methodology for browsing and editing database information using an Internet browser. This technology provides a complete pre-built framework for dynamic database driven web sites. According to the present invention, the DataCrawler system incorporates an HTML-based, reusable Universal Data Access Graphical User Interface ("UDAGUI") component. UDAGUI provides a standardized format for navigating and editing database information. The reusable UDAGUI component effectively eliminates the need for programming because this component provides all the basic functionality necessary to browse and update relational database information. The plug and play configuration process is all that is needed to access and edit information contained in SQL databases using a web browser.

The DataCrawler system that incorporates UDAGUI technology enables web developers of all skill levels to almost instantly create, deploy and maintain comprehensive web database applications all from a standard HTML Internet browser. End-users and administrators benefit from a standardized system that minimizes training and ensures a consistent, familiar interface.

The UDAGUI component provides a universal methodology for dynamically managing simple or complex interrelated views of data within an HTML interface.

This component includes a hierarchical tree-view navigation tool combined with a data driven display form. It is highly optimized for browser based database exploration and data entry.

The UDAGUI is the building block for the DataCrawler system allowing very large number of web database applications to be created, deployed, managed, maintained and utilized all from one centralized engine. When new features or changes are made to the central engine, these updates can be almost instantly deployed worldwide.

The human administrator of the DataCrawler system utilizes a UDAGUI component by configuring one or more data sources and defining the format for the display of information. At runtime, the UDAGUI component will determine the configuration settings, fetch the appropriate database information and render the HTML page according to the format defined by the administrator. No programming is required for this process.

By the incorporation of innovative HTML components, the DataCrawler system, among other things, solves fundamental problems posed by the limitations of static HTML. HTML provides limited tools for browsing and displaying multiple levels of hierarchical information at once. The DataCrawler system, in combination with HTML, provides an easily configured tree-view database browsing tool that allows database information to be displayed in a hierarchical format. This combination allows the operator to dynamically explore multi-level interrelated information from many different data sources at once.

The data entry capabilities of conventional HTML forms are limited compared to the functionality offered by platform specific programming environments. In contrast, the DataCrawler system employs powerful editing functionality. Full featured data entry forms are easily administered and are automatically linked to the back end database.

The combined process of search, navigation and editing of relational database information in a conventional Web environment is typically difficult because of the lack of information processing tools available. The DataCrawler system combines navigation and editing functionality together in a powerful Split-Screen mode that overcomes the problems inherent within HTML, such as lack of sub-forms.

Developing, administrating and maintaining Web database applications is typically an expensive and time consuming process. Since reduced administration is an aim of DataCrawler system, administrators are able to eliminate the development process by using a pre-built applications environment that requires no programming. Changes are easily incorporated into the system and are deployed almost instantly.

The DataCrawler system is a secure system with group level permissions. The system has configurable login authentication as well as anonymous access. Data entry update privileges may be defined at the group level and information contained within data sources can be group or individually owned.

The DataCrawler system has other advantages. The DataCrawler system is 100% HTML based with no Java or ActiveX components. This means that all users can access the system regardless of the version or type of browser they have. Another advantage is the incorporation of the UDAGUI component that provides the reusable building block for the DataCrawler system. It is also advantageous that the DataCrawler system employs a hierarchical data navigation tool. This interface allows dynamic multi-level browsing of interrelated database information. Still another advantage is the overcoming of a problem that sub-forms are not available in HTML. In the DataCrawler system, a split-screen mode and combination of tree navigation with data forms solves this problem in an elegant manner.

These and other features and advantages will be described in detail in, and will be apparent from, the remainder of the specification and claims referring to the drawings.

BRIEF DESCRIPTION OF THE DRAWINGS

FIGS. 1, 28 are diagrams of computer-based systems.

FIGS. 2–13, 16–26 and 29–36 illustrate computer display screens.

DETAILED DESCRIPTION

The present invention is directed to a system and method for managing database information to be presented in HTML format for retrieval and display by a Web browser.

The DataCrawler system includes a web application server that provides a pre-built framework for building dynamic HTML applications that directly browse and edit database information. The system provides a simplified and structured graphical user interface that permits end-users to create HTML content using only a standard Web browser, also known as an Internet browser. A 100% HTML based interface structure permits the DataCrawler system to be very adaptable to changing technologies. The DataCrawler system provides a robust solution for accessing database information over the Internet. The DataCrawler system provides a complete, secure link between the End-User and the back-end Database, providing all graphical and program functionality necessary for complete Data Processing. The system allows organizations to quickly deploy database applications while providing end-users with a standardized format for accessing information. The DataCrawler system provides a completely pre-built application that is configured to work with new or existing databases. The system supplies a powerful HTML environment that allows end-users to navigate, view and edit database information using standard Internet browsers.

Figure 1:
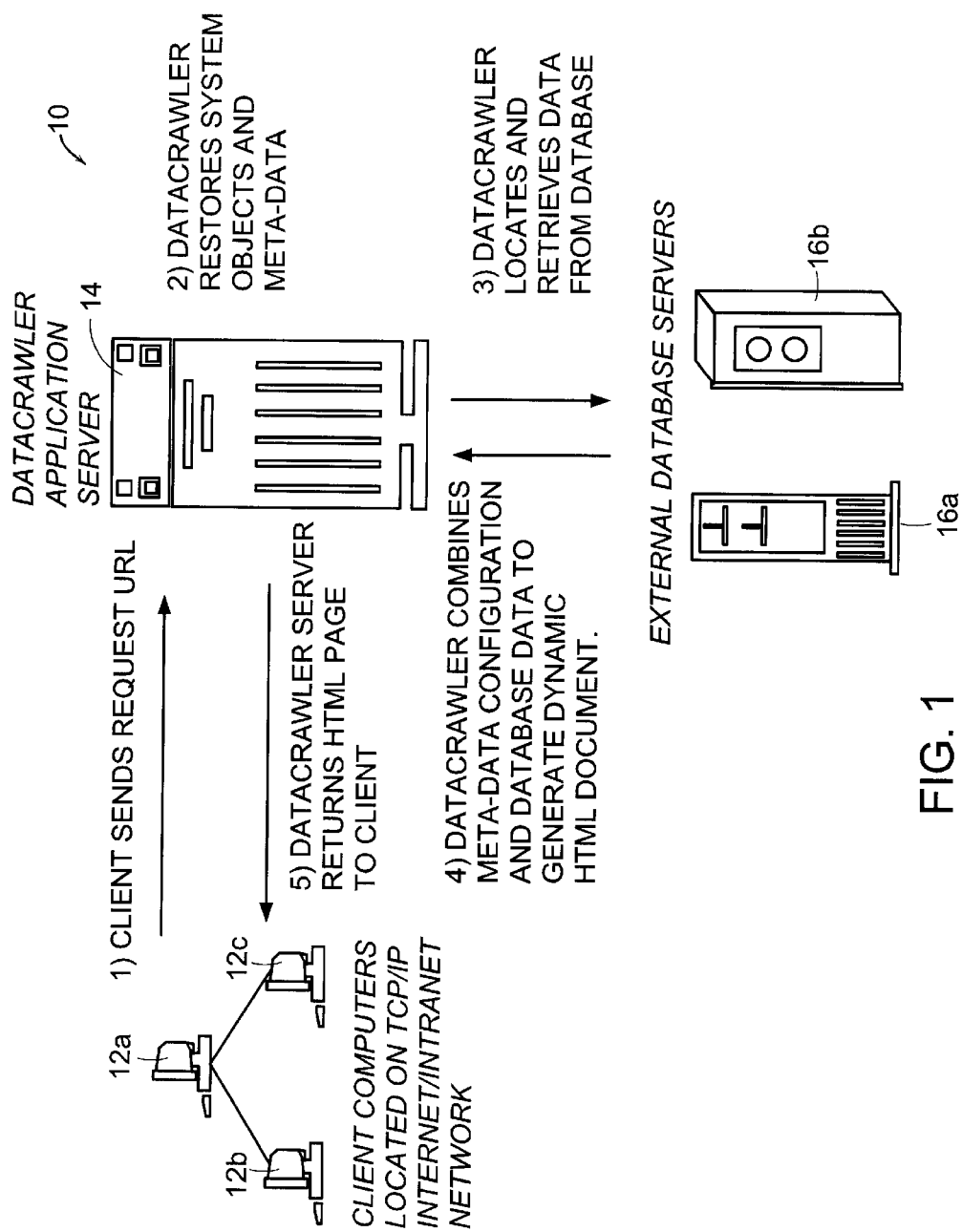

FIG. 1 illustrates a computer system 10 in which a client computer 12*a* (or 12*b* or 12*c*) communicates with a DataCrawler application server 14 that communicates with a database server 16*a* (or 16*b*). The DataCrawler application server 14 is responsible for retrieving information from a database system at the database server, formatting the information according to a Hypertext Markup Language ("HTML") format, and sending the information to the client computer 12*a* where Web browser software running on the client computer 12*a* can display the information. A display of representative information is shown in FIG. 2, generally at 100.

The DataCrawler application server 14 sends the HTML formatted information to the client computer 12*a* in response to a Request Uniform Resource Locator ("URL") directive sent by the client computer 12*a*. The Request URL directive includes arguments (described below) that assist the DataCrawler application server 14 in determining which portions of the information stored by the database system are to be included in the information formatted in HTML format and sent to the client computer 12*a*. The HTML formatted information is also formatted in a hierarchical organization in accordance with definitions, for example, nodes (described below).

Data sources and nodes are building blocks of an application supplied by the DataCrawler application server. Each data source defines a portion of the database system, and each node represents a data source. When linked hierarchically, the nodes implement an application in which portions of the database system are linked hierarchically.

A hierarchical, HTML formatted display of information ("hierarchical page") organized according to the application is provided to the Web browser. When an end-user at the client computer 12*a* makes a selection on the hierarchical page, the DataCrawler application server creates another hierarchical page according to the data source and node definitions. The information that is delivered to the client computer 12*a* in response to the selection, for display by the Web browser is based on the same hierarchical page.

In FIG. 2, generally at 100, the hierarchical page includes a hierarchical tree view that includes nodes organized hierarchically and records are displayed under the nodes. When a selection is made in the hierarchical tree view, a replacement HTML formatted hierarchical page is created. For example, if the end-user makes a selection to expand a section of the tree view, an HTML formatted hierarchical page is provided in which the section is shown as expanded.

The replacement hierarchical page is constructed as follows. A node is associated with the end-user's selection, and the page is arranged to include the node's records. Each node above the associated node is recursively determined and included in the page (known as "walking up the tree"), and each node below the associated node is recursively determined and included in the page (known as "walking down the tree").

Figure 4:
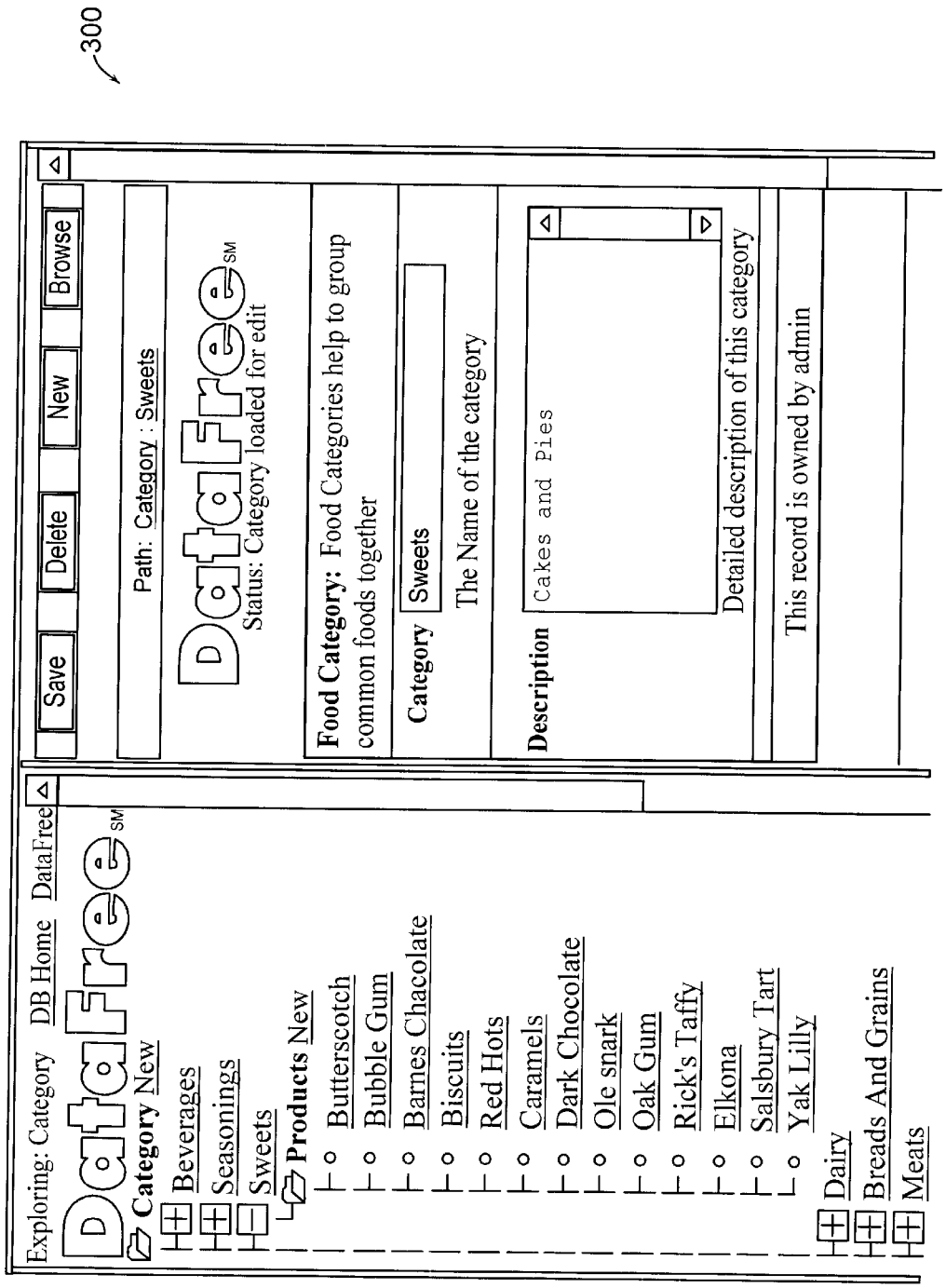

As explained in more detail below, the DataCrawler application server provides a data display view that allows a record of database information to be manipulated within an HTML environment, as shown in FIG. 3, generally at 200. Through the use of HTML frames, the data display view may be shown side-by-side with the hierarchical tree view as shown in FIG. 4, generally at 300. The side by side view is particularly desirable because the record shown in the data display view can be selected in the hierarchical tree view. The DataCrawler application server provides a DataCrawler system that will now be described in more detail.

The DataCrawler system includes a reusable interface, known as the Universal Data Access Graphical User Interface ("UDAGUI") (see FIG. 28), that incorporates a reusable interface that provides a standardized method for manipulating structured data. This configurable interface provides end-users with the functionality to search, navigate, display and edit information contained in some form of structured database. The interface is implemented to be data-independent so that the actual data source is transparent to the end-user. UDAGUI is principally based upon two highly integrated components that combine to provide comprehensive data access: a read-only Universal Data Expander ("UDE") and a Universal Data Display ("UDD"). The UDE is used for searching and navigating of multiple records, and the UDD is for viewing and editing a single record of information.

The Universal Data Expander, described in more detail below, provides a graphical format for dynamically searching, navigating and exploring information in a hierarchical manner. Data is presented in a read-only summarized list that is structured in a hierarchical, parent-child, tree-view format where each source of data may be linked to zero or more child sources of data. An important feature of the UDE is its ability to represent almost any view of information—from the most simple to the most complex interrelated views of data. The end-user employs this tool to browse, navigate and pinpoint available information.

The Universal Data Display, described in more detail below, provides a single point of data display for the purpose of viewing or editing one piece of information at a time. End-users utilize this component to display or edit a single record of database information. All data editing functionality occurs in a similar fashion regardless of the actual data format.

The Universal Data Expander and the Universal Data Display, when fully integrated provide a configurable and reusable standardized HTML data access interface. This interface provides search, navigation, browsing and editing of external information in a standardized format. This system process is implemented as dynamic HTML components that cooperate to provide a standardized methodology for accessing database information within the environment of an HTML-based Web browser.

The DataCrawler system is configured to be data independent so that the details of data access protocols and methodology are transparent to the end-user. It is intended that the DataCrawler system is structured to work with any type of data storage. This means that the DataCrawler interface does not have to be re-written or reconfigured to accept a new data format. Therefore, with any new system it is only necessary to create a new data access module to provide the routines that the system expects.

In one specific implementation, the DataCrawler system works with at least three distinct data types: SQL accessible databases used by the administrator, database management directives, and simple key value text files used by the system. This implementation will permit future access to other types of data storage.

The DataCrawler system that employs a configurable HTML data access system facilitates the creation, deployment and maintenance of complete Internet-based applications. All functionality of the DataCrawler system is performed using a standard Internet browser. The system provides user/group login and session management, integrated menuing, flexible data source formatting and application management. In a specific embodiment, DataCrawler does not require any additional programming of HTML or SQL. However, a user may incorporate additional HTML or SQL programming if he or she desires.

The DataCrawler system has three different system application interfaces: End-User, Database Administration, and System Administration. These three applications provide an example of the reusability of the UDAGUI system given that each provides different functionality and work with different data types yet use the same interface.

The End-User interface controls the interaction between the end-user operator and one or more back-end database(s), typically SQL databases. The operator manipulates the DataCrawler interface to directly query and modify the databases that have been set up by the database administrator. The interface, and the user accounts allowed to access it, are defined and maintained within the administration interface.

The Database Administration interface provides the interaction between the database administrator operator and the DataCrawler system configuration. This operator uses the DataCrawler system to create, deploy and maintain end-user interfaces that will allow access to databases.

The System Administration interface provides the interaction between the DataCrawler system configuration and the actual source code. The system administrator uses the DataCrawler system to create, deploy and maintain administrator interfaces that will allow access to DataCrawler configuration.

As stated, the three interfaces just described illustrate the reusability of the DataCrawler system. Throughout the system, there are other examples of reusability, such as in the help and menuing systems.

In one embodiment of the present invention, the DataCrawler system is implemented as an HTML-based Web application. The application uses the process of serving dynamically created HTML web pages for each user request. This architecture is a highly suitable platform for the implementation of the UDAGUI as a complete, integrated database application environment.

By way of example, on a very high level, the DataCrawler system operates like a Common Gateway Interface ("CGI")

program running in partnership with a hypertext transfer protocol ("HTTP") web server on a networked operating system. The DataCrawler system uses application programming interface ("API") technology that permits enhanced performance.

The DataCrawler system incorporates the use of standard Web platform dynamically generated HTML pages for each user request. The Web server is responsible for handling the incoming and outgoing requests, while the Program application controls the actual HTML content. The Program is the main application process of the DataCrawler system. The Program application requires its own system and configuration storage and interacts with one or more end-user databases.

In an embodiment of the present invention, the DataCrawler system is implemented using the following software platform components:

The "Linux" version of the UNIX operating system (v2.2).

The Apache HTTP Web Server (v1.3.6).

The Perl programming language and Interpreter (v5.005).

The mod_perl high-performance module for integrating Perl with the Apache web server.

The MySQL SQL Relational Database System.

The DataCrawler Program is composed of the following pieces:

A highly object-oriented main program written in the Perl programming language.

A system and configuration database based upon simple KEY=VALUE text files.

One or more End-User databases.

The Web server is responsible for a number of functions including the Web server waiting for user requests. When a user request is received for the DataCrawler application, the Web server will perform security processing as necessary and then pass the request on to the Program. The Program generates a text-based HTML page and sends it back to the Web server. The Web server then returns this page to the end-user.

In operation, the Program executes as follows. The Program receives a URL address along with an argument list of KEY=VALUE pairs from the end-user. The URL tells the Program the client from which the user request originated and the Program name. The Argument list that is generated contains the essential parameters used to generate the actual HTML page returned to the user. The Program then uses the arguments to determine which initial state/configuration/database files must be restored, and uses the information found in the files to open more state/configuration/database files. This process will be repeated many times in the course of processing each user request. While information is retrieved, the system pieces together an HTML page that is formatted for the unique user and the parameters that have returned. The Program then returns the HTML page to the Web server.

Control of the Program is determined by the Argument list. The Argument list provides essentially all of the information needed to identify the user and format the HTML page. This list of Key=Value pairs contains all of the Program variables that are needed by the system.

There are many different arguments used by the system. The most commonly used arguments and the purposes are now described. Symbols may be changed or scrambled, but the function will remain the same.

The "UserID" or "uid" parameter (passed as "u") is a unique Session identifier. The UserID is a string that uniquely identifies the session. It is used by the system to restore the session and state information. The session file is the first file restored by the system, and will include the UserName that identifies the User, as well as other state and session information. Each user is assigned a new unique UserID whenever the user begins a new session and it is retained throughout the duration of the session.

Every session contains a URL. An example of a URL with a uid is as follows:

crawler?u=393128299954&m=n&db=food_supply

The "db" parameter (passed as "db") represents the active or requested Database. The Database is a string value that uniquely identifies a Database within the current working directory. If a value is passed, the system will proceed to use this as the working database. All data read and edited will originate from this Database. There can only be one Database being acted upon at a time. An example of a URL with a Database parameter is as follows:

crawler?u=393128299954&m=n&db=food_supply

The "source" parameter (passed as "s") uniquely identifies a Node within the active Database. The value is a string that uniquely identifies a Node. When a source value is received, the Program will restore the requested Node Object from the working Database. The Node Object is responsible for initiating the entire Data view. Only one source is valid at a time.

Figure 5:

FIG. 5, generally at 400, illustrates an example with the use of "db" and "source" parameters. As shown, db='food_supply' and source='137'. The incoming parameters specify Node '137' within the 'food_supply' database. The system will retrieve and restore Node 137 (and all associated objects) from the food_supply database to render this display.

The "mode" parameter (passed as "m") identifies the Program Mode that the Program has or to which it will switch. There are two primary modes:

1. "Navigate" Mode (passed as "n") switches the Program to the UDE exploration mode.
2. "Display" Mode (passed as "d") switches the Program to the single record UDD mode.

There are also other separate modes for User activities called "User Modes" which are each prefixed with a "u". These include activities such user login, security, and validation.

Figure 6:

FIG. 6, generally at 500, illustrates the use of this mode="n" parameter. This example shows the Program Mode is "n" Navigate, so the UDE Tree-View Browser is displayed.

FIG. 3, generally at 200, illustrates the use of the mode="d" parameter. This example shows the Program Mode is Display. The UDD view is displayed with a single Record in Edit mode.

The "smode" parameter (passed as "d") refers to the Screen or Window Mode. There are two primary Screen Modes used by the system:

1. Full-Screen the default and represented by "f". In Full-Screen mode, the end-user flips back and forth between full screen views of the Navigate and Display Modes, one at a time.
2. Split-Screen is represented by "s". Split screen allows the end-user to split the screen (using frames) and utilize both Screen Modes simultaneously for increased efficiency.

Figure 7:
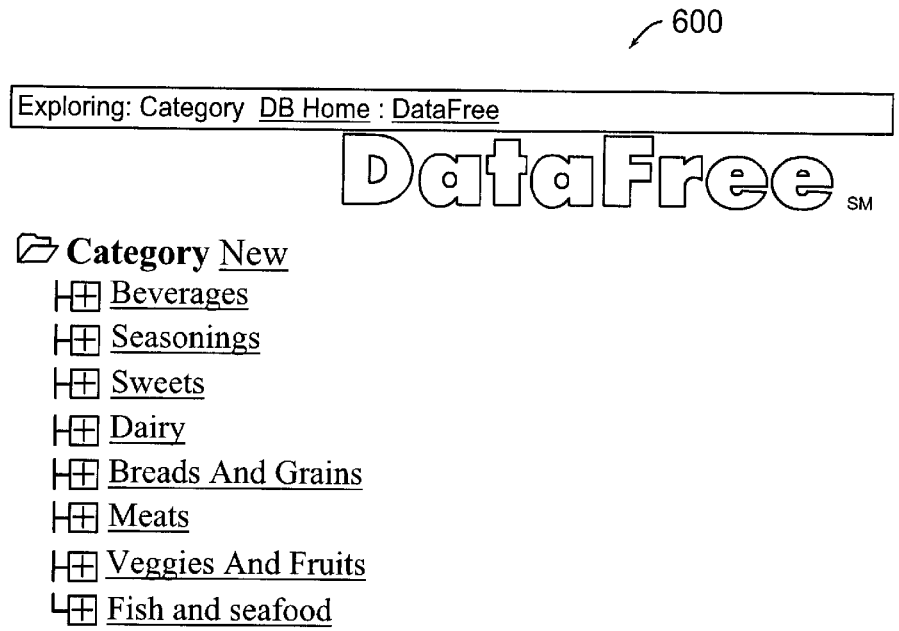

FIG. 7, generally at 600, illustrates the use of the smode="f" parameter. This example shows that the Screen Mode is Full-Screen, which corresponds to a full screen HTML page with no frames.

FIG. 4, generally at 300, illustrates the use of the smode="s" parameter. This example shows that the Screen Mode is Split-Screen. There are two separate HTML Frames showing.

The "action" parameter (passed as "a") controls the expansion and contraction of data within the UDE display. There are four different actions that control two different components of the UDE. Only one of the four actions is valid at one time.

The actions "Expand Source" and "Contract Source" tell the system how to control the display of records within a Node. The actions "Expand Record" and "Contract Record" tell the system how to control the display of hierarchically related Child Nodes.

Figure 8:
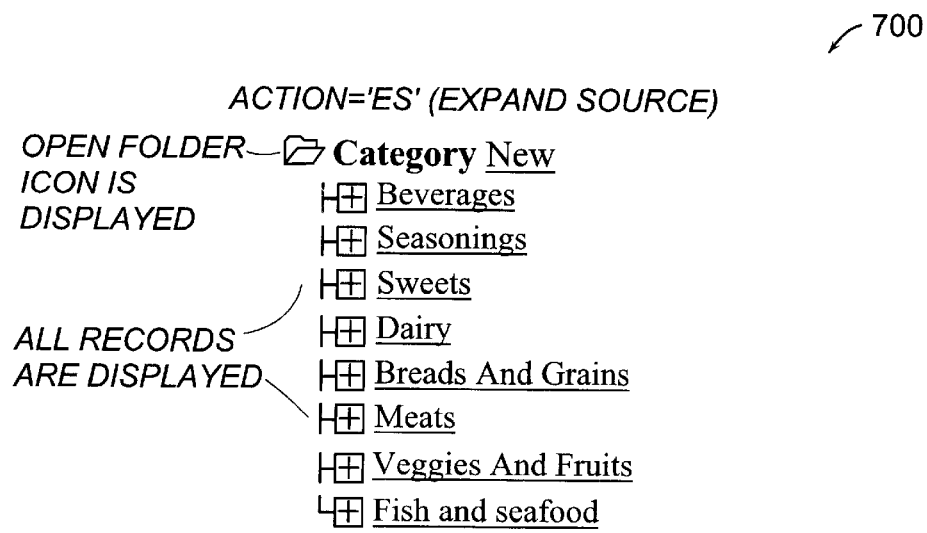

"Expand Source" ("es") parameter tells the system to display the Source as "Expanded" and display all records available. This action is signified by the "Open Folder" icon. FIG. 8, generally at 700, illustrates the use of expanding the "Category" Node, in connection with the following URL:

URL=crawler?u=393128299954&m=n&db=food_supply&s=137&d=f&a=es

"Contract Source" ("cs") tells the system to display the Source as "Contracted" and hide all records available in the view. This action is signified by the "Close Folder" icon. FIG. 9, generally at 800, illustrates the use of contracting the "Category" Node, in connection with the following URL:

URL=crawler?u=393128299954&m=n&db=food_supply&s=137&d=f&a=cs

"Expand record" ("er") tells the system to display the Record as "Expanded" and display all child Nodes that are hierarchically linked. This action is signified by the 'Expand' icon. FIG. 10, generally at 900, illustrates the use of expanding the Related Child Node(s) for the Record "Sweets", which shows all related Nodes, in connection with the URL listed below. Each Node has a "default" Action. In this case the "Products" Node has a default Action of "es" (Expand Source).

URL=crawler?u=393128299954&m=n&db=food_supply&s=137&d=f&a=er

Figure 11:
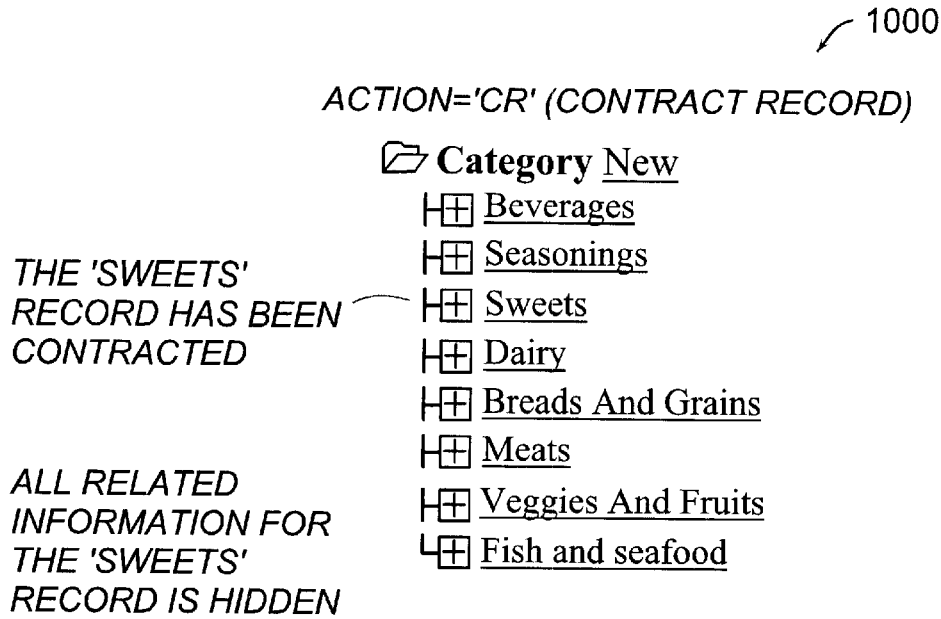

"Contract Record" ("cr") tells the system to display the Record as "Contracted" and hide all of the hierarchically linked Nodes. This action is signified by the "Contract" icon. FIG. 11, generally at 1000, illustrates the use of contracting the "Sweets" Record, which hides all Related Information, in connection with the following URL:

URL=crawler?u=393128299954&m=n&db=food_supply&s=137&d=f&a=cr

Figure 12:
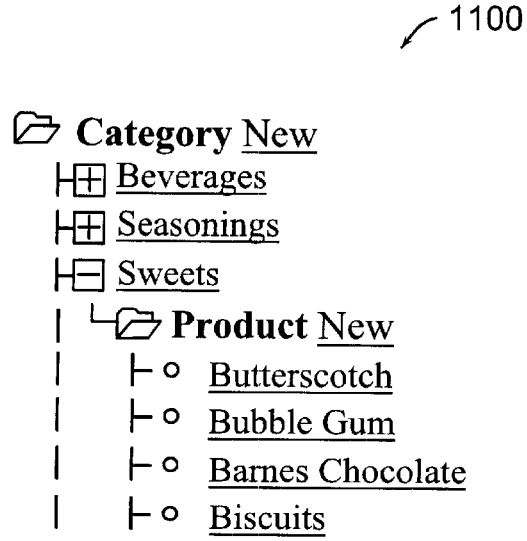

The "key" parameter (passed as "k") identifies the key (usually the Primary Key) of the Node's Data Source. The key is often a unique key value that will allow the Program to retrieve the record from the Database. Note that some Data Sources require more than one key, so the key value may not be unique, depending on the Data Source. The key is passed when a user clicks on a link that symbolizes a record. FIG. 12 illustrates the use of the key parameters in connection with the URL below. When the End-User clicks on the Expand Icon for the "Sweets" Record, the URL includes the key value of the record: "3". In this case, the key value represents the Primary Key of the "Category" Data Source and "3" uniquely identifies the Sweets Record.

URL=crawler?u=393128299954&m=n&db=food_supply&k=3&s=137&d=f&a=er

The "parentkey" parameter (passed as "p") represents the key value that identifies a parent record within a parent Data Source that is hierarchically related to the active record. This key is usually a unique value that allows the system to locate the Parent Record when the current record/Source is a child. The Program uses this parent key to identify and locate the parent record, part of the process that is involved when "walking" the Data view hierarchy.

Figure 13:
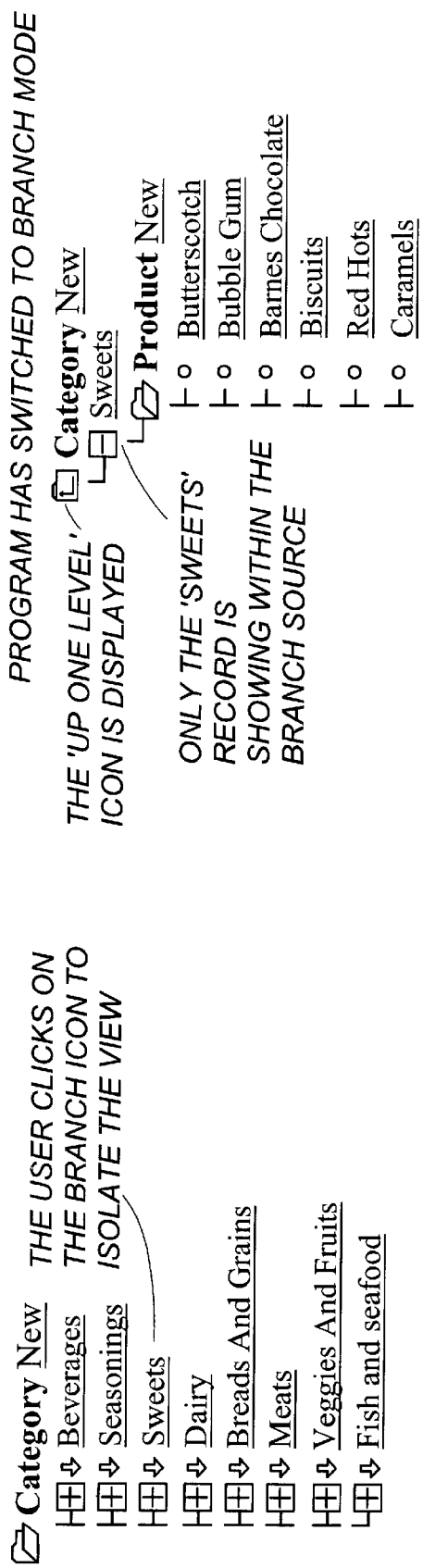

The "stopnode" parameter (passed as "sn") determines the branching point for the UDE view. When a stopnode is set, the system will restrict the ascent of the hierarchy to limit the amount of hierarchical information returned to the end-user. This results in a more isolated, less cluttered screen that is highly suited for closer inspection of a particular view of information. The parameter is only valid in an application that contains hierarchical relations. FIG. 13, generally at 1200, illustrates the use of "sw" as follows, in connection with the URL below. When the end-user clicks on the "Explicit Branch" icon for the "Sweets" Record, the URL includes the stopnode parameter of '137' which is the key for the Category Node. The system will only display the active record from the stopnode source.

URL=crawler?u=393128299954&m=n&db=food_supply&k=3&sn=137&d=f&a=er

The "stopkey" parameter (passed as "sk") is associated with the stopnode parameter. The "sk" parameter is only used for Recursive data sources. When a Node is recursive, it uses itself as a parent data source. Because of this, a stopnode is not sufficient to limit the hierarchy (due to the fact that a stopnode specifies a node only) and the stopkey must be included. The stopkey is then used to determine the ascent limit.

Figure 14:
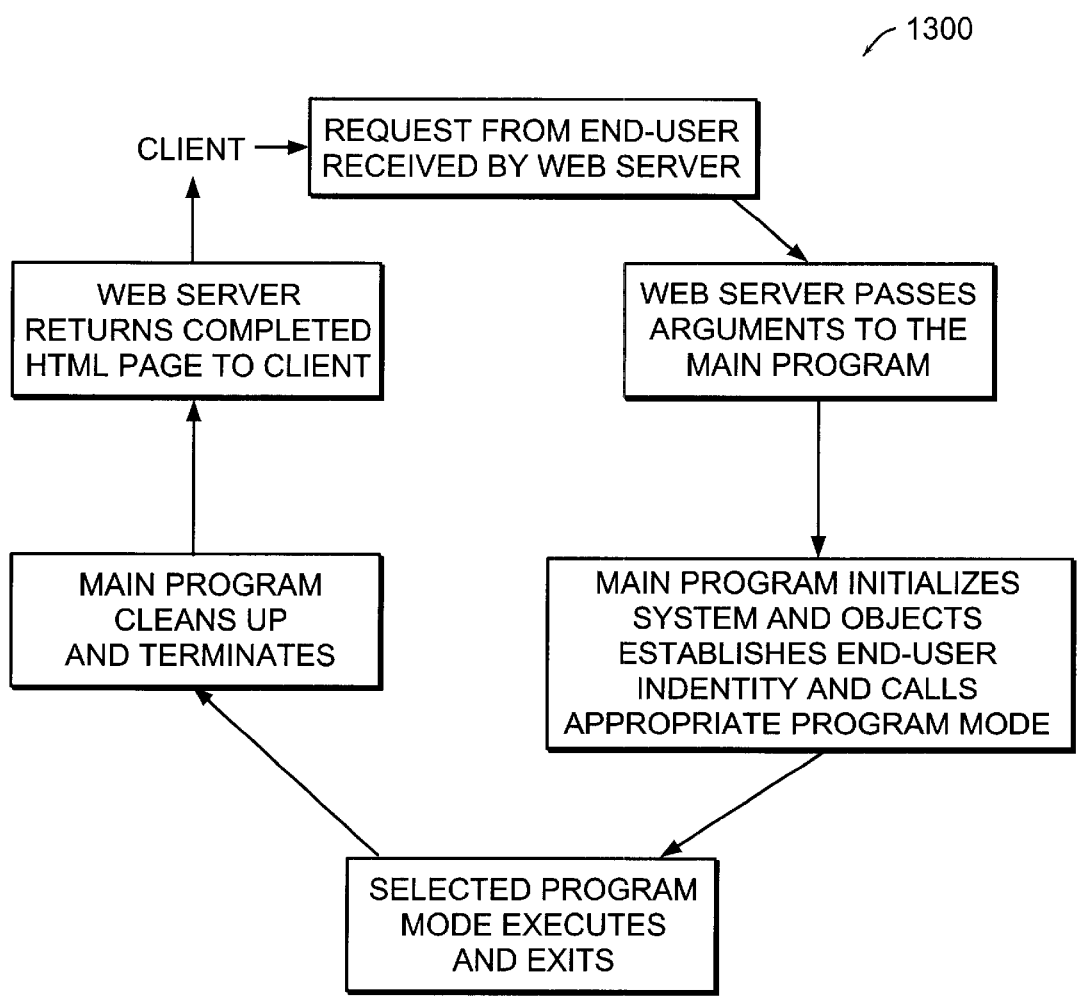
FIGS. 14–15 and 27 are flow diagrams of computer-based procedures.

FIG. 14, generally at 1300, illustrates the operation of the DataCrawler main program. The main program file is the startup file called by the URL. This file, in one embodiment, is named "crawler." DataCrawler is highly object-oriented so the main program is relatively short. The main program is responsible for the following operations:

1. Loading all system objects and libraries.
2. Initiating the Base Class Object.
3. Optionally Entering the User Mode.
4. Optionally Initiating, displaying and destroying the Navigate (UDE) Program Mode.
5. Optionally Initiating, displaying and destroying the Display (UDD) Program Mode.
6. Cleaning up and destroying the Base Class object.

The Universal Data Expander ("NUDE") provides the end-user with a virtual window into the database. The UDE allows the end-user to explore information represented in any number of possible relationships from simple views of a single data source to highly complex views of many different interrelated data sources.

The UDE will display a hierarchical representation of the data by first walking up the hierarchy from each Child Node to its Parent Node by restoring each successive parent. This gives the system a map of the hierarchical activity. Then the system traverses this map and formats the page for the end-user. The process of traversing the "map" of the active hierarchy is a complex process that involves the use of many other objects.

The UDE Mode is controlled by the "Navigate" system object and is called directly from the main program. The main points of functionality performed by the Navigate Object are as follows.

The Object creates a "Map" of the hierarchy path by calling the "trace_parent" function. This function starts with the Source Node (passed in the "source" parameter and already restored by the Base Class object) and will ascend the entire hierarchy involved by restoring each successive Parent Node found. The subroutine calls itself recursively until each parent Node has been traced and there are no more Parent Nodes remaining. This routine builds a linked list of the hierarchy starting from the top level Node. This linked list will be used by a "grow" subroutine to "walk" the hierarchy and print the complete tree structure including all levels of Data and the path that leads to the Source Node that initiated the call.

The object descends the linked-list map and formats the UDE view. The display subroutine next calls the Grow subroutine to walk the hierarchy and output the actual HTML text interface. This subroutine begins with the top-level Node and then descends the hierarchy by calling itself recursively for each successive Child Node that is found. While the "trace_parent" subroutine provides the actual active path of the hierarchy for the view, the Grow subroutine must restore and display any additional Nodes at each level of hierarchy that are not involved with the action yet are still part of the view. Each Node will display its header information according to the current action for it. If required, the Node's records will be listed. The data is retrieved by accessing the Node's attached Query Object. At any time between records a new Child Node may interrupt and begin displaying itself by making a recursive call to the Grow subroutine.

The UDE represents the hierarchy involved between one or more Nodes by displaying the family of Nodes and the data involved according to the end-user request. Each Node controls the view of one data source within the UDE. The administrator can create UDE applications as simple, single sources of data, or link Nodes together in a Parent-Child format to create complex, interrelated views of information.

Figure 19:
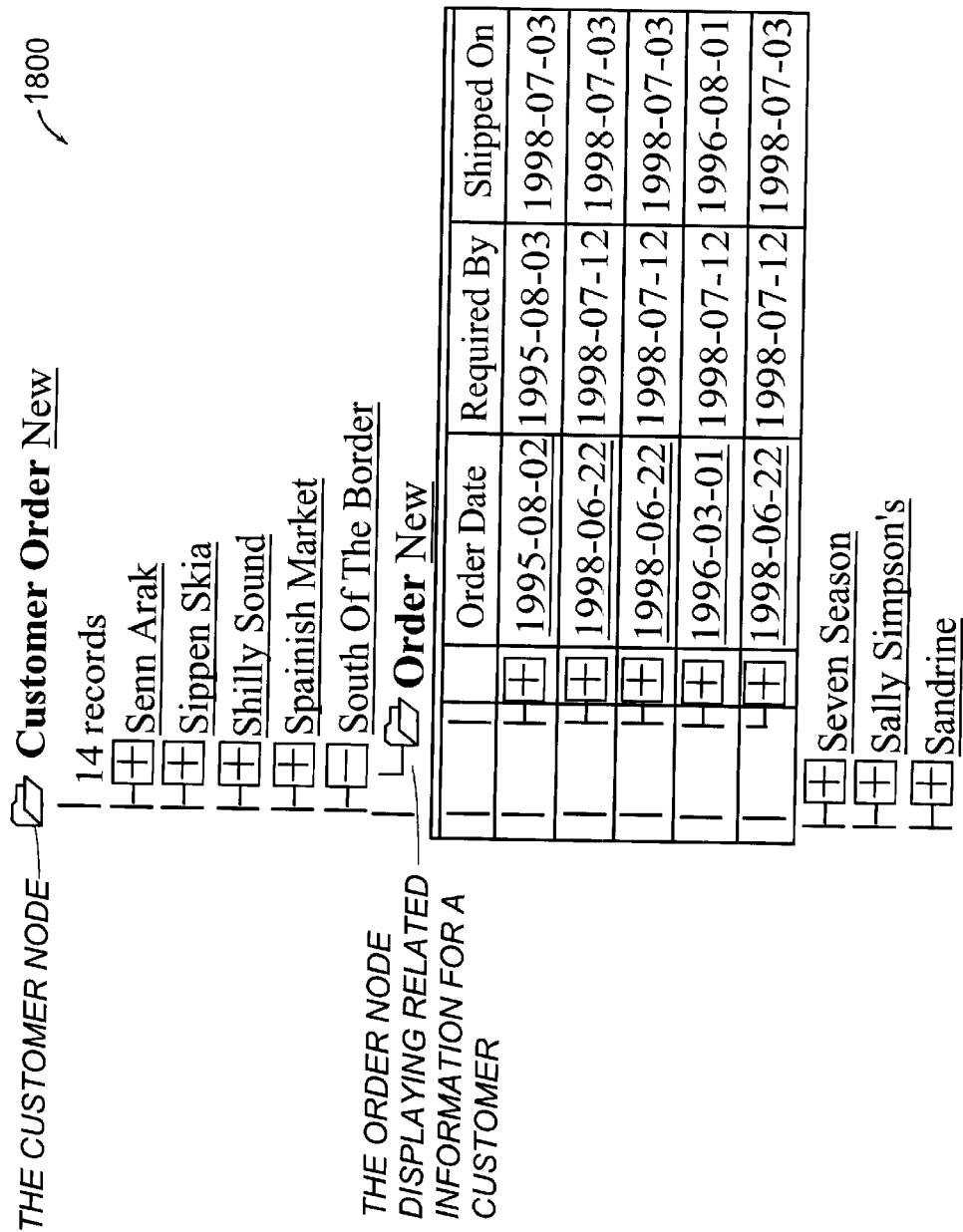
Figure 20:
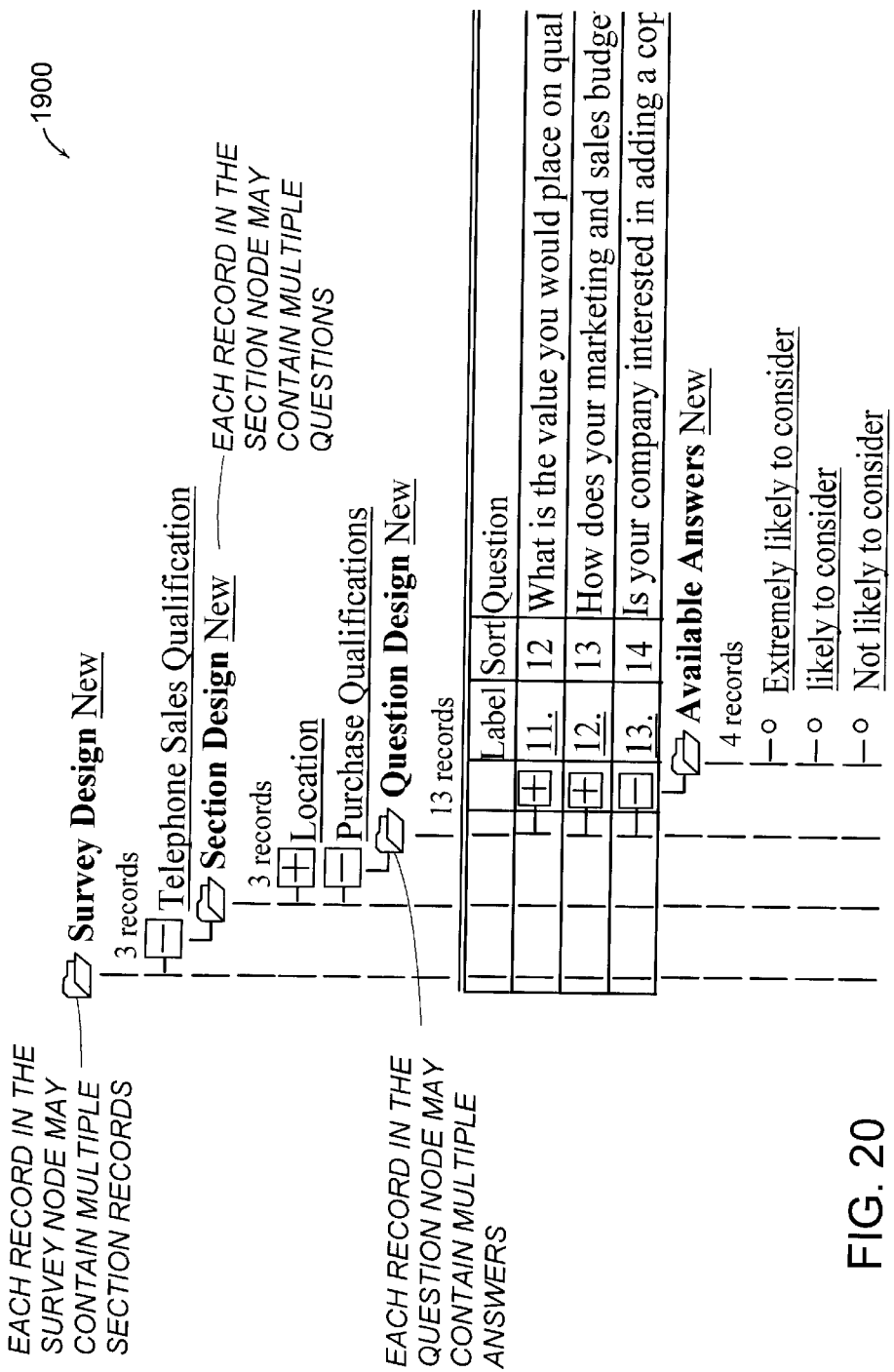

FIG. 18, generally at 1700, illustrates an example of a simple Universal Data Expander view, in connection with exploring the "Customers" data source. The end-user has requested to view the information available within one Node of information according to certain criteria. The Node requested is a Top-Level Node and has no parent, so only the top-level Node's Data is displayed. The "Expand Record" Icon is signaling to the end-user that more hierarchy exists further below. FIG. 19, generally at 1800, illustrates a UDE application with a Parent-Child structure. FIG. 19 shows two Nodes forming a Parent-Child Tree Listing demonstrating a Parent data source 'Customers' with attached Child orders information. FIG. 20, generally at 1900, illustrates an example of a more complex view containing four related Nodes.

Now described in more detail is the DataCrawler Universal Data Display. The Data Crawler Universal Data Display. ("UDD") is a software process that uses passed parameters, configuration data and a common set of routines to dynamically generate an HTML-based Graphical User Interface ("GUI") used for data processing over a TCP/IP network. The process controls the display of information on the client screen providing all basic functionality necessary to create, modify, delete and read one record of information from a source of structured information. The process receives client HTTP requests, interfaces directly with low-level data storage formats to retrieve requested information, and returns a formatted HTML page representing a view of the information prepared for viewing or editing.

The UDD is implemented to provide a standardized GUI for the manipulation of a single record of Database Information within the HTML environment. A goal is to provide a common GUI that allows an End-User to insert, update, delete or read a single record from a Data Source independently of the details of how the information is physically stored. This allows the system to employ only one Program Routine as the primary method for the inserting, editing or deleting data from a Data Source. A benefit to this approach is to lower the time and cost of developing, deploying and maintaining the Data Processing portion of Database Applications as well as maintaining the system itself.

The UDD is the Program Mode Handler responsible for displaying a Single Record detail of database information at one time. The UDD Program Mode is the primary End-User interface used for the input of Data into a Data Source. The UDD displays a single record of information from a Data Source by creating an HTML page at runtime according to the incoming parameters included in the URL. The final displayed HTML page may be read-only or may allow full scale data processing. Data Entry functionality includes the ability to Insert, Update, and Delete a single record of database information directly. The UDD is thus the primary interface used for Data Input within the DataCrawler system.

The UDD is commonly used in two different modes, Data Entry and Read Only. The view displayed to the End-User depends upon the security permissions allocated to the UserGroup the User belongs to as well as the Node and it's associated objects.

The UDD in Data Entry mode is the primary GUI used for End-User Database editing. This is the single Program Mode for handling all End-User editing including Database Inserts, updates and deletions. In this Mode the UDD is capable of generating efficient and powerful Data Entry forms. The system has been implemented to provide many state of the art features. The system provides many configurable programming solutions for data entry forms that are difficult to provide in a conventional HTML environment.

The UDD in Read Only mode allows users that do not have security permission to read a particular record of database information to view the data. The Read Only view offers many graphical and functional formatting features allowing many different options for display.

The UDD is a complete, highly efficient Data Processing environment for editing one record of Database Information at a time. The UDD provides a complete Interface between the End-User and the physical data storage handling all aspects of the interaction.

The UDD presents the End-User with a view of one Record from a Data Source that may or may not be editable. The UDD display typically contains three elements:

1. A series of Button or Link action items that allow the End-User to create, update and delete a Database Record from the current DataSource.
2. An interactive 'Travel Map' that provides the End-User with a visual indication of exactly where in the hierarchy the End-User is currently located. This 'Travel Map' also servers as a direct link back to the UDE Mode.
3. The actual Database Record displayed as it is has been structured from within the DataCrawler system, available for editing, reading or some combination of the two.

UDD provides a centralized object-oriented program that uses the parameter list contained in the URL to restore system objects and their configuration parameters that combine to generate an HTML web page for the End-User. The final HTML web page represents a single record from a single Data Source (although a Data Source object may itself contain information from more than one physical Data Source).

The End-User initiates the UDD mode by sending a URL that contains the Mode parameter with a value of 'Display' (m=d). This parameter is passed to the Main Program. If the request is valid and secure, the Main Program will create a new Form Object and call its display routine.

The Form Object is responsible for generating the entire UDD HTML page that will be returned to the End-User. The final UDD display is a product of different objects commonly linked together through the Node, User and Base-Class Object, all of which were previously restored by the Main Program. The display routine will generate a single record view according to the Node and other parameters that were passed to the Main Program. The display routine will create the top level formatting and call its child objects to display their specific formatting.

The Node is the central Object acting as a container for all other Objects used in the UDD Program Mode. The system passes a Source key along with a Database name. From these parameters the system is able to locate and restore the target Node within the target Database. All Nodes contain references to two important child Objects used in the UDD Program Mode: a Form Object and a DataSource Object. The Form and the DataSource Objects and their associated Child Objects are responsible for all of the UDD formatting.

The Form Object controls much of the overall formatting of the UDD display. Configuration options allow control over display formatting and Data Entry mode. The Form object also controls certain overall formatting options for the Sub Objects found within, including the ButtonGroup, Path, FieldGroup and Field Objects.

The ButtonGroup object is typically the first object called as the Action Buttons are typically located at the top of the Display. A ButtonGroup is a group of Button objects. A Button Object is an HTML submit/image/link/button action item that will either submit the HTML Data Form or send a URL that performs some system action. The Button Objects used in a typical Data Entry Data Form include the following:

1. A 'save' button that will save the current record the End-User is editing. When the End-User clicks on the save button the HTML Form will be submitted and the system will attempt to save the edited information.
2. A 'delete' button will delete the current record. When the End-User clicks on the delete button the system will attempt to delete the current record from the Data Source.
3. A 'new' button to create records. When the User clicks on the new button the system will load an empty record so that the End-User can enter a new record.
4. A 'Navigate' button so that the End-User can switch the system back to the UDE Navigate view.

Figure 21:
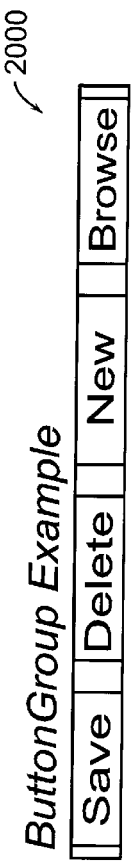
Figure 31:

FIG. 31, generally at 3000, and FIG. 21, generally at 2000, illustrate examples of a ButtonGroup.

The Path Object is responsible for displaying a hyperlink path that represents a 'Travel Map' of the session's currently active hierarchy. The Path is similar to the UDE Display view but does not contain any non-active records, and it lists information in a flat list. The Path represents a set of hierarchically linked Nodes and contains two elements for each one. The Caption is listed first which describes the Node Data Source followed by the currently active record.

Figure 22:
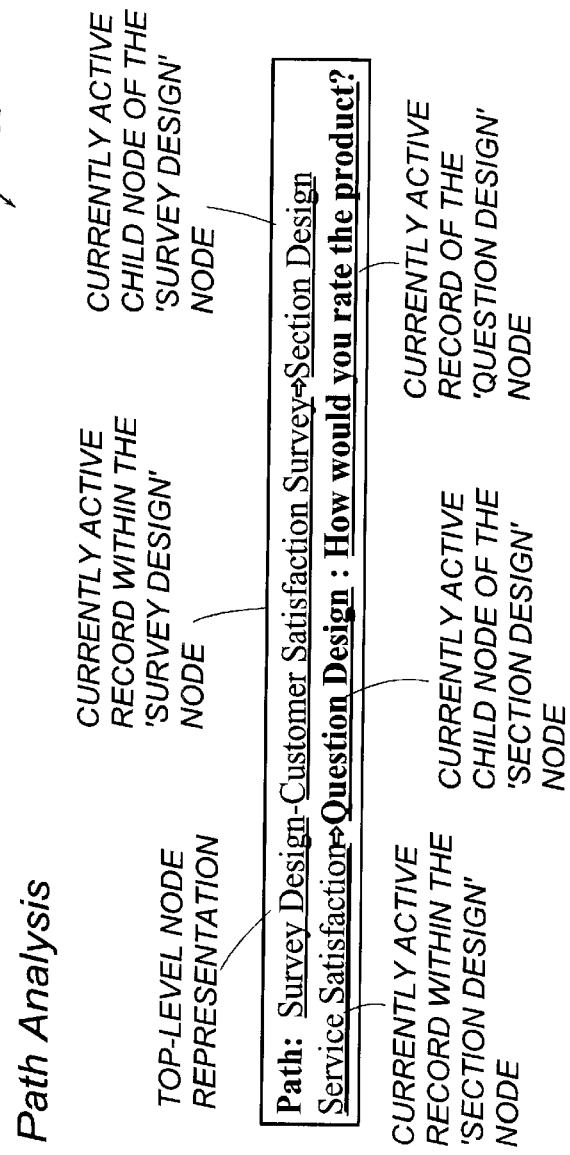
Figure 34:
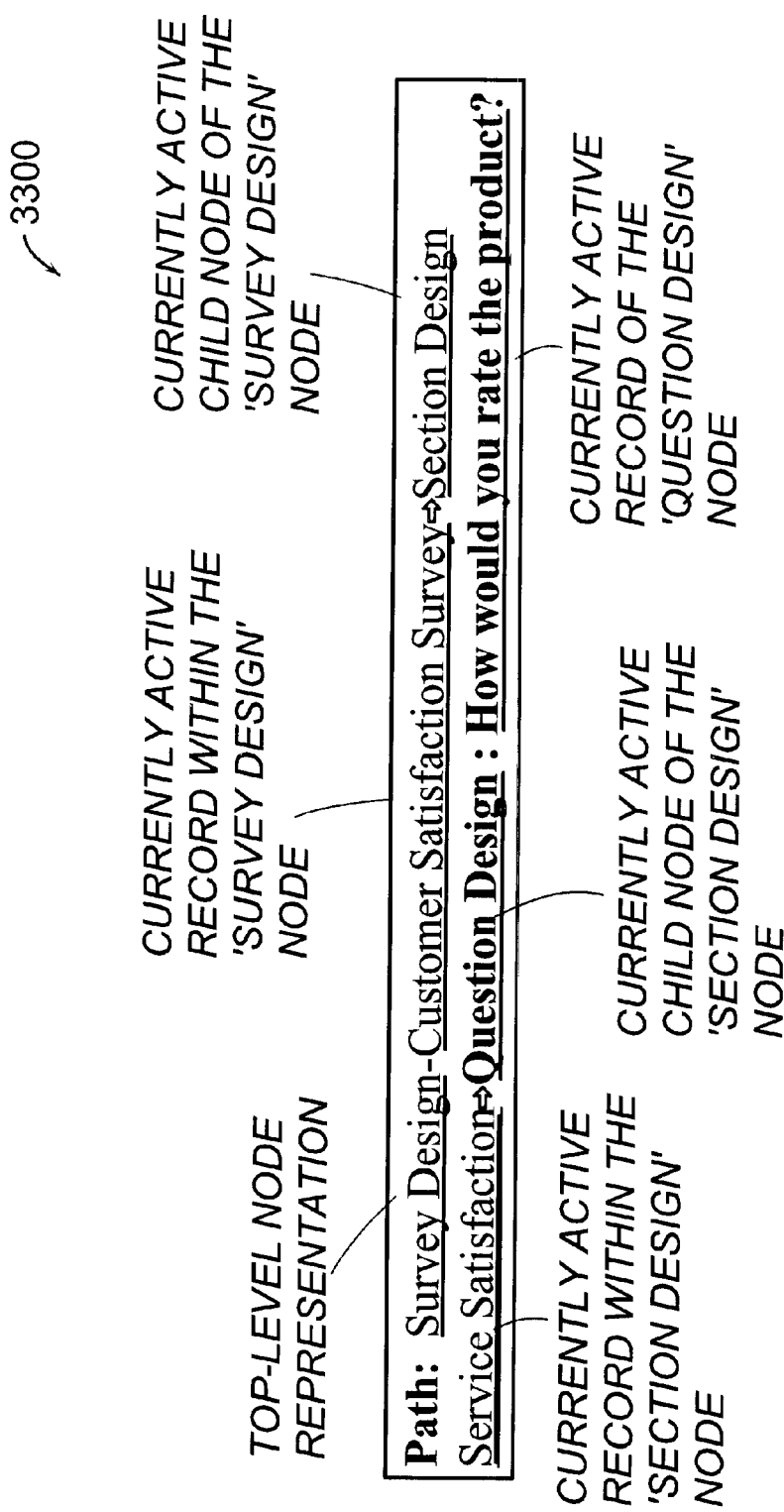

With respect to Path analysis (see FIG. 22, generally at 2100, and FIG. 34, generally at 3300), the Path is typically listed at the top of the UDD view to provide the End-User with a graphical representation of where they are located at any one time. This is especially important within the UDD Data Entry mode as the End-User may be located anywhere within the hierarchy and must have a clear understanding of exactly which Data Source they are editing and which records are related.

Figure 23:
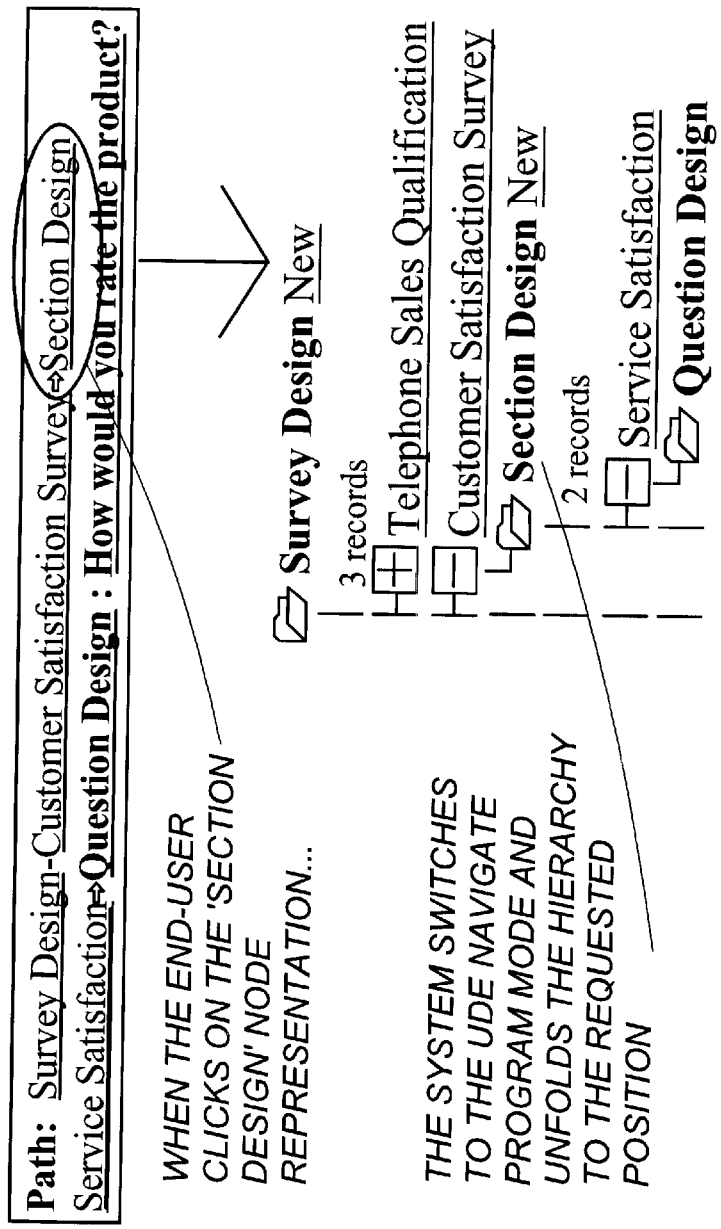
Figure 36:
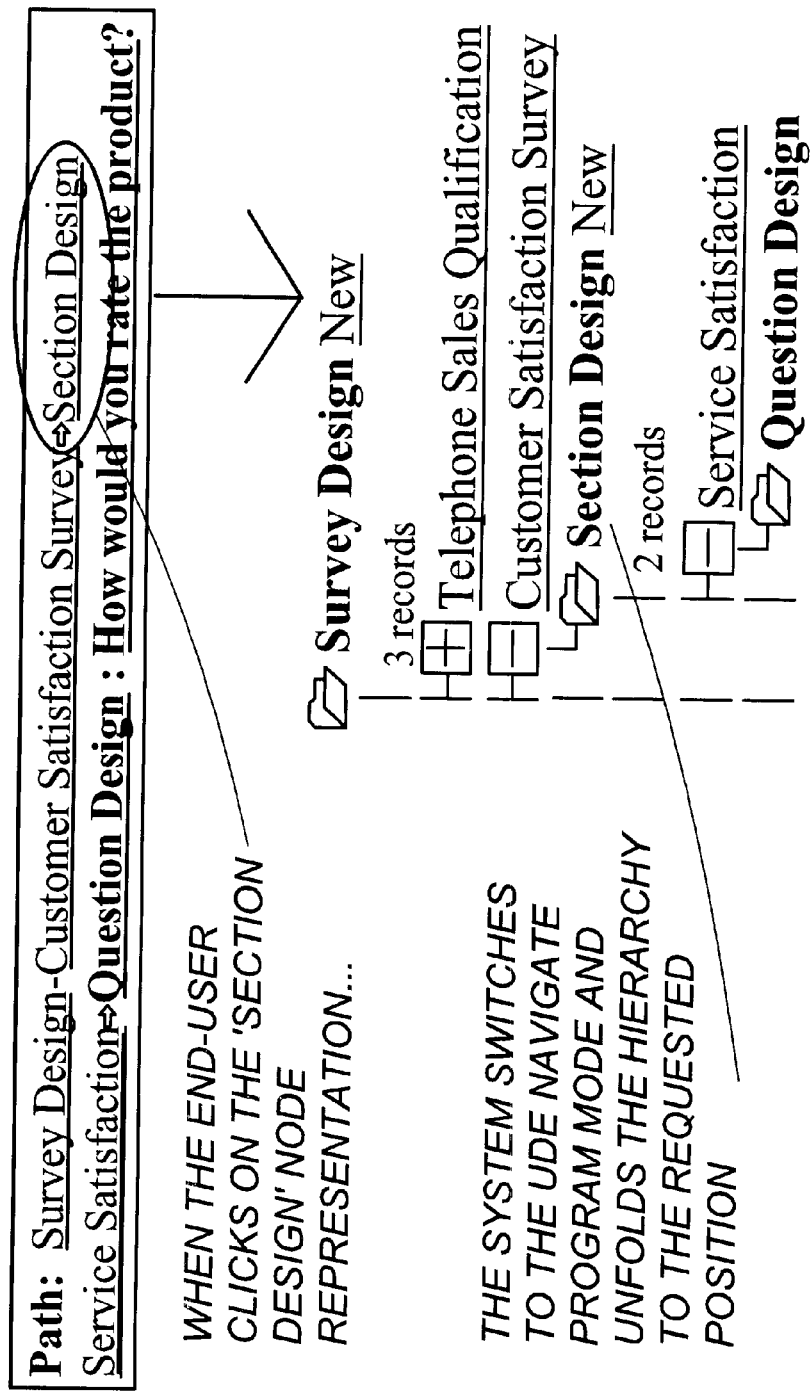

FIG. 36, generally at 3500, and FIG. 23, generally at 2200, illustrate examples in which the Path allows the End-User to jump from the UDD Display Mode to the UDE Navigate Mode.

The Path starts by listing the Top-Level Node followed by the currently active record within that Node. Each successive Child Node that is currently active will follow. If no record has been selected from the final Node, the Record element will display 'New Record'.

The Path is administrated from within the Form configuration. Because the Path is a product of the currently active hierarchy, configuration options are limited.

The DataSource Object provides the system with the methods and configuration necessary for retrieving information from a specific source of Structured Information. Within the Display Object, the DataSource Object holds the formatting configuration needed to display a single record of database information. The DataSource also acts as a Parent container for Field Group and Field Objects that compose and detail the actual structure within the DataSource as well as define the display formatting for the End-User.

FieldGroup Objects are used to group and organize related Fields together. FieldGroups contain Fields as Child Objects. The FieldGroup contains formatting options that are specific to all fields contained within itself. The type of formatting typically includes a group caption, description and color along with Help text that will be included in the online help system. The formatting may be applied before, during or after the group of Field Objects contained within are displayed.

Figure 24:
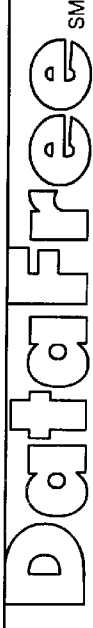
Figure 35:
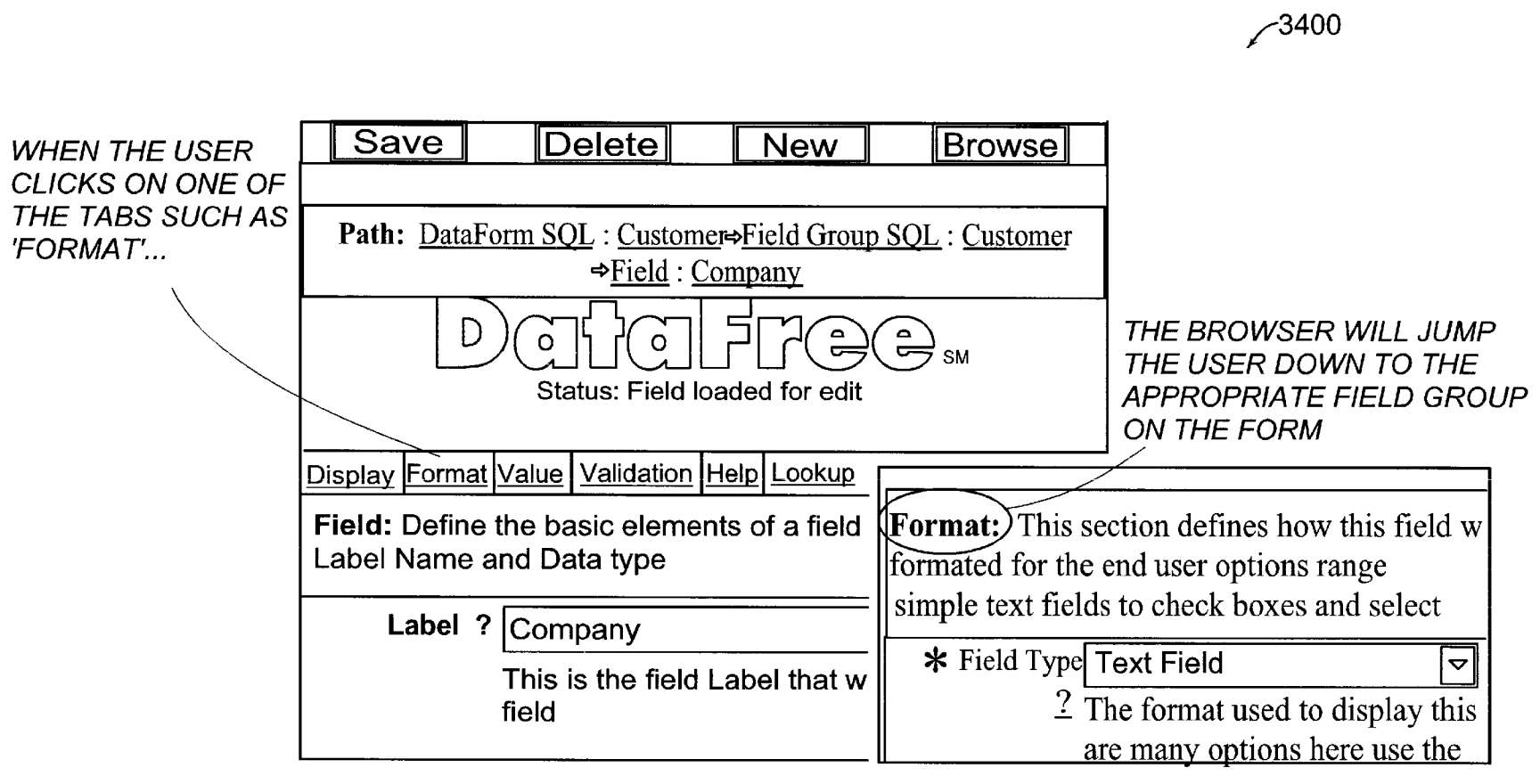

With respect to Tab functionality (see FIGS. 24 and 35, generally at 2300 and 3400), unless disabled, each Field-Group will automatically be integrated into a page indexing scheme that provides a feature ("Tabs") that has the benefit of allowing the user to click on the FieldGroup caption to jump down the page to the FieldGroup and its contents. The DataCrawler system provides Tab functionality using HTML.

Tabs allow the administrator to join common groups of fields together and thereby organize more complex Data Entry forms. This Tab feature is integrated and automated by the system. The Tab process is facilitated by providing the Administrator with Field Groups to organize each set of fields. When the Form is generated at runtime, an anchor link is placed at the top of the form (unless individually disabled) for each Field Group Object located within the Query Object. If the End-User clicks on this Tab, the browser will transfer to the proper Field Group Anchor point on the form as shown in an example in FIG. 35.

Figures 32, 33:
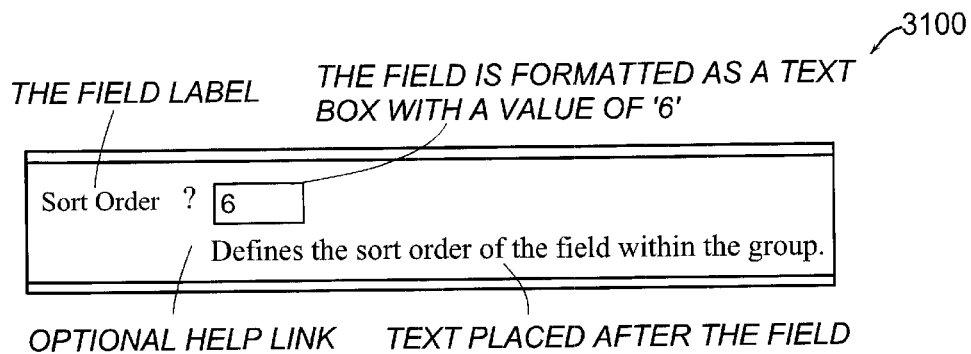

A FieldGroup may also represent an 'Option Group'. This allows the End-User to designate a FieldGroup as a choice to the End-User, effectively giving it a Data Entry value. The End-User may then choose the option to signify activation of the group of related Fields. DataCrawler provides Option Group functionality within the HTML environment. FIG. 33, generally at 3200, and FIG. 25, generally at 2400, illustrate examples of a Field Group.

The Field Object represents the actual structure of the Information stored within a DataSource. Fields contain all of the information necessary to configure and format each Field of the Database Record for display in the UDD Mode. Fields are automatically bound directly to the Data Source by the system. This means that the Administrator needs only to create the Field definition, and the system will link it to the existing DataSource. If it exists, the Program will load the existing value of the Field up at runtime.

Fields are typically displayed in a stacked, ordered manner within a FieldGroup. Each Field is usually formatted with an identifying Label followed by an optional Help link and then the actual Field itself.

FIG. 32, generally at 3200, and FIG. 26, generally at 2500, illustrate examples of a Field formatted as a simple text box.

There are many options for formatting the value of the Field for the End-User. The System may display the actual Field value present as a read-only value or simple text box. Alternatively, the values of Fields from other DataSources may be substituted at runtime. The Program will read the configuration from each Field object to determine the proper formatting.

There are many different options to format the Field for display to the End-User. The System will use the field configuration parameters at runtime to generate the actual Field display. Fields formats may range from read-only text and images to editable text boxes and drop-down lists from external Data Sources.

The Field configuration interface is subject to change and as such the options may grow, change or be rearranged within the system. This explanation demonstrates the most common aspects of the Field configuration.

The Field Configuration Interface is divided into a number of configuration groups that will now be described.

Label: The label identifies the Field to the End-User.

Name: The name of the field. This name must be unique as it maps directly to an actual Data Source Field Name. Note that on some Data Types this value is not visible or editable because the system automatically handles the binding without user input.

Data Class: The Data Class allows the user to define which data Class the Field belongs to. This configuration may be used by the system to access and edit information within the DataSource as well as sorting and calculations. Currently there are three options available: Text, Numeric and Date. When the system creates SQL queries to be sent to an SQL Database, the Data Class option may be used to distinguish different data formats. For example, Text values must be 'quoted' while numeric values require no formatting.

Field Group represents the Field group that the Field is attached to.

Sort Order designates the order that the Field will be presented within the Field Group.

Allow Filter: This option will include the Field in the Filter so that the End-User will be able to search on it.

Size represents the horizontal size of a text or text area Field.

Before and After Options allow text, images and other HTML formatting to be displayed before and/or after the Field is displayed.

Field Type: defines the how the Field is to be Formatted when displayed to the End-User. This important option has many different possibilities, including the ones described as follows:

The Text format is the default for a new Field Object. The system will format the text type as a standard HTML Form INPUT TYPE=TEXT tag. The TextArea is similar to Text type but allows the actual text box to span multiple rows allowing a larger quantity of text. The TextOnInsert allows the End-User to input a text value when creating a new record, but then switches the formatting to read-only after the record has been saved. This is useful for values that should be initialized but not changed. The Password formatting is similar to a text box except that any entered or existing text will be shown as Asterisk characters. The Hidden Field will be formatted as an HTML hidden field so that the value will be passed to the server yet not visible to the End-User. The Image type will allow the End-User to upload an Image to the Server when in Edit mode, and will then display a the image in read-only mode.

The next options described allow the display of multiple list values from which the End-User may choose. Because of this each requires an external Lookup to be defined for the Field (except for a single value checkbox). The External Lookup will provide a list of values for the system to display to the End-User. The system allows the External Lookup to display symbolic 'User-Friendly' values while actually storing other actual data, such as keys. The Select option provides the End-User with a list of values to choose from in a drop-down list or list box format. The CheckBox type displays a standard HTML checkbox as the sole input for the Field. The End-User may only activate or deactivate the value. Checkboxes may be used alone or in groups. Multiple selections are allowed. The Radio Button type displays a standard Radio Button form element providing multiple selections yet enforcing a single-choice answer. The Read-Only Lookup provides an non-editable view of data from an External Lookup. The Selection Source is a Lookup that allows the End-User to directly set values within the Data Entry Form by choosing values from another separate UDE screen.

The DataCrawler system relies on objects for program operation. These objects will now be described. The DataCrawler Base Class Object is the top level object within the system. It is the first object that is initiated before any other object. The Base Class object is the first object created and the last object destroyed. All objects contain a pointer (possibly indirect) to the Base Class Object. All objects also inherit the Base Class directly as an object and have access to its subroutines and constant values. This allows the Base Class Object to act as the 'global' source of information for the Session. The base Class is the first Object created and the last Object destroyed.

When the Program starts execution, the Base Class is created. The Base Class will always create a User Object, handing off the state, security and session configuration to this Object. The Base Class will also create a Node Object if there is a Source (and Database) passed in. The Node will become responsible for continuing all data formatting.

The Base Class Object is responsible for arguments, methods and variables that must remain global to the rest of the Session. The Base Class Object's responsibilities include the following:

1. System Initiation.
2. Initiation of User Object and Source Node Object.
3. All initial and global parameter processing.
4. All low level Object restoration.
5. Global variable management.
6. System path and directory locations.
7. URL generation.
8. Session and cookie configuration.
9. Initial and wrap-up HTML formatting.

The User Object is the system representation of the End-User within the Program. The User Object includes End-User and session information. Each End-User may have more than one session active at one time. This allows the End-User to multi-task and access information from different DataCrawler Databases concurrently.

When the End-User logs in to the system, the End-User's past session options are loaded and a new session started. The User object is responsible for enforcing security within each Database for the User. The User Object is available globally to the system so that different system Objects may have access to its methods and configuration to control data access and display formatting.

The User Object is entirely responsible for all User Mode activites. User Mode includes session and account configuration as well as Database creation and membership.

Figure 15:
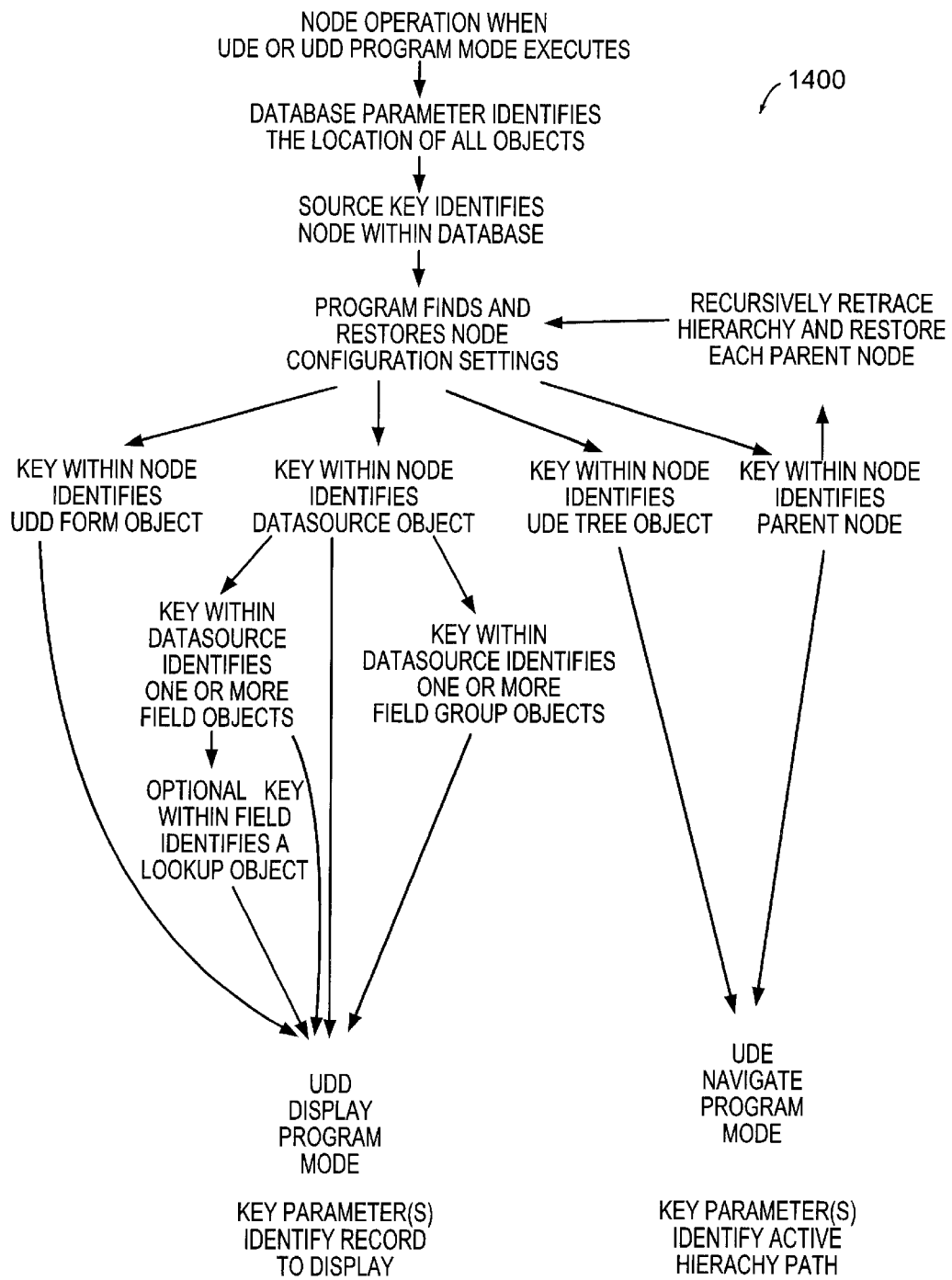

With respect to the Node object, each Node contains a complete specification of how to retrieve and format Information from a Data Source A Node represents the nucleus of each view of Database Information (see FIG. 15). It is the central object that is either directly or indirectly responsible for all Database Information retrieval and formatting. Although there are many objects that combine to create each view of data, a Node ties them all together.

Nodes control the two primary Program Modes of the system: the UDE and UDD. The parameter 'source' passed by the system represents a Node within the specified Database.

All Nodes contain a link to a 'DataSource' Object and so indirectly define the information to manipulate and display. Nodes represent a view of a Data Set. The Data Source is simply linked, it can never be accessed directly. Nodes on the other hand can be called directly from outside the application. An external web page can contain a URL that jumps directly to any particular DataCrawler Node View.

Nodes contain Child 'Form' and 'Tree' Objects which act as templates to control how the UDE and UDD Program Modes are formatted. Nodes have a great deal of control over the UDE display while their Child DataSource Objects have more control over the UDD mode.

The process of linking Nodes together in a hierarchical fashion is the basis of all DataCrawler applications. A Node definition may include Parent and Child relationships with other Nodes. Each Node can have only one Parent Node, yet may contain one or more Child Nodes.

Sets of Nodes are linked together to represent interrelated Datasets. Each Node controls the view of one DataSource within Set's view. The administrator can utilize Node Applications as simple, single sources of data, or link Nodes together in a Parent-Child format to create complex, interrelated views of information.

A Node definition may include Parent and Child relationships with other Nodes. Each Node can have only one Parent Node, yet may contain one or more Child Nodes.

DataCrawler Applications can be simple, complex or somewhere in between. Each Node may contain an unlimited number of Child Nodes and each Child Node may itself contain unlimited Child Nodes.

When a Node is restored, the system will check whether or not it contains any hierarchically linked Parent or Child Nodes. This process is repeated for each successive Parent Node until the entire Hierarchy is known. Upon completion of the hierarchy, the system has all the information necessary to display the entire 'Family' tree.

Node Families are the basis of the entire DataCrawler system. All interfaces from Administrator to End-User are Node applications.

Figure 16:
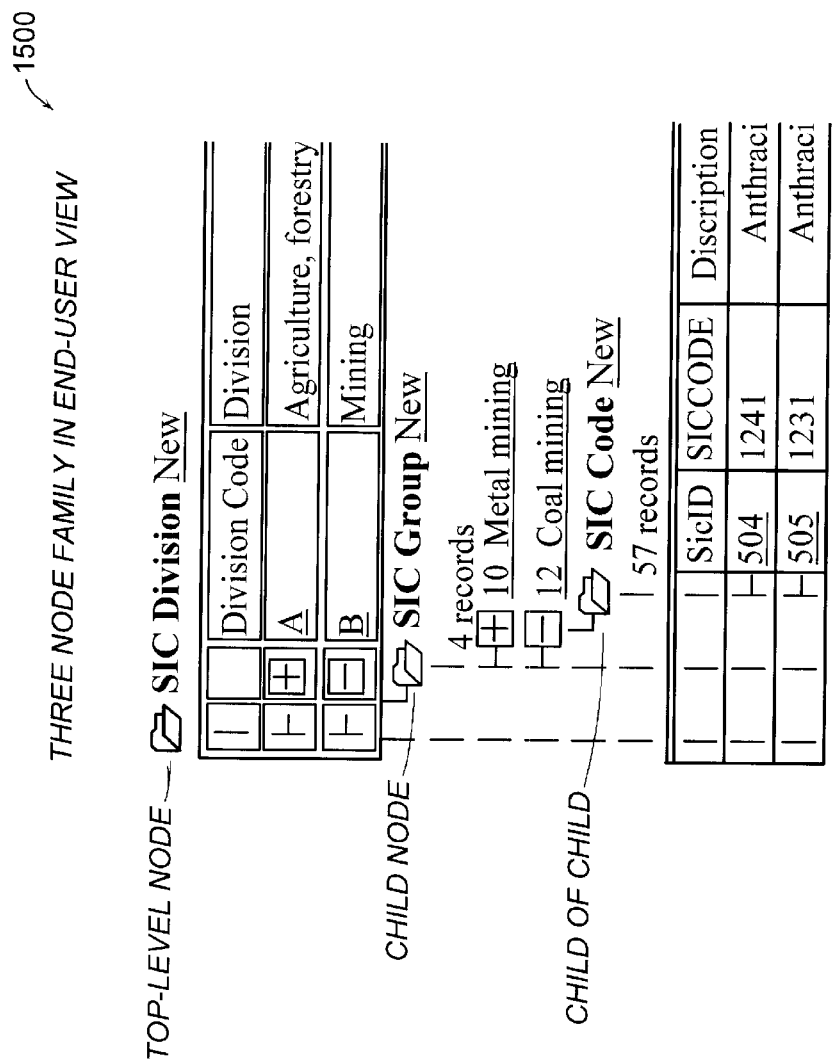

With respect to the types of Node relationships, all Nodes share the same basic properties, yet there are two distinct types that interact with their 'Family Member' Nodes differently. Regular Nodes have a top level Node and a (theoretically) infinite number of Child Nodes, while any of the Child Nodes may contain a (theoretically) Infinite number of Child Nodes. Each Node is unique to a set of Nodes and may not be reused with other sets. A Normal Node may not include itself as a Child Node. FIG. 16 illustrates an example of a family of three Normal Nodes.

Figure 17:
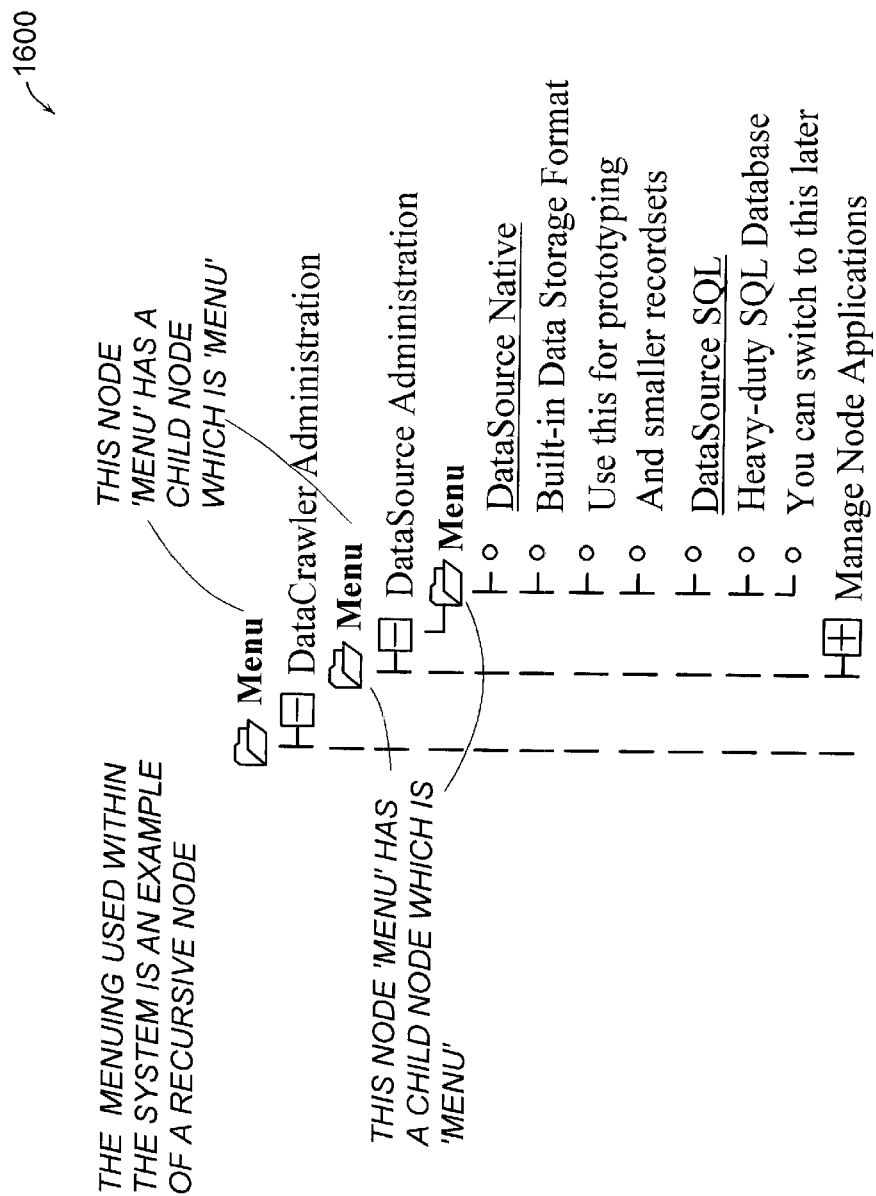

Recursive Nodes allow a Node to use itself as a Child and Parent Node. This means that a Recursive Node is reusable, although only to itself in a recursive manner. This feature allows unlimited hierarchical views of information from the same Data View, recursively. Some examples of a recursive Node include the system Menuing, and the Node editor itself. FIG. 17, generally at 1600, illustrates an example of a Recursive Node.

By its nature, a Recursive Node cannot have a Parent Node (other than itself). Yet a Recursive Node may have unlimited Child Nodes (besides itself), just like a regular Node.

Demonstrations and analysis of the DataCrawler system now be described. The UDE (Navigation Mode) allows the end-user to dynamically explore the active Data Set. In a typical case, almost all of the end-user's time will be centered around this view. Navigation Mode provides the ability to present data in a hierarchical fashion so that the end-user can quickly explore and pinpoint the desired information in a simple graphical manner even when the data set is large.

FIG. 2, generally at 100, illustrates exploring a simple navigation view. This view demonstrates a listing of records from a single Data Source. There are no other hierarchically linked data sources. The example shows all of the products listed from the 'Product' table, which is located in the 'food_supply' database.

In such a case, the URL sent by the end-user is as follows:

/demo/crawler?u=393128299954&m=n&db=food_supply&s=143&a=es

The analysis that follows shows each component of the URL and the role played in generating the final view shown in FIG. 2.

"crawler" is the name of the DataCrawler Program that will be executed by the Web Server. The Web Server path to the file is '/demo'.

u=393128299954: UserID=393128299954. The system will retrieve record '393128299954' from the session database. Within the file will be session and state information that identifies the End-User and is used for security, configuration and formatting.

m=n: mode=Navigate the parameter tells the Program to switch to UDE Navigate Mode, which is shown in FIG. 2.

db=food_supply: Database=food_supply. The Program will look in the /demo directory for a Database named 'food_supply'. If a valid, the program will apply the rest of the arguments to this Database and continue.

s=143 source=143. The Program will search for a node located in the system directory of the 'food_supply' database. The Node is the first step in the process of fetching the Data. The Query (Data Source) object must be restored as well as other objects that assist in formatting the output. The Program will apply any constraints (keys or filters), fetch the Data and format the HTML page.

d=f smode=Full-Screen. The Program is in Full-Screen mode.

a=es action=Expand Source. The action that was either sent or predefined as default was Expand Source. This tells the Program to expand the current Source and display all of the records that it contains.

In the next case, the end-user has decided to contract the view and hide the Records (see FIG. 29, generally at 2800). The only difference in the URL is that the action=Contract Source (cs) as displayed.

The next example illustrates exploring a Source with a parent-child relationship.

The following demonstrations are used to explore the argument list in more detail and how the program uses the arguments to explore interrelated data. The following examples are taken from the actual production system found at http://www.datacrawler.com.

The next demonstration illustrates distribution: categories and products from a food service database.

This demonstration illustrates an example of exploring two interrelated DataSources. At the top level there are food categories produced from and SQL database table called 'Categories'. Within each food category are products which come from an SQL database called 'Products'. The DataCrawler system manages this view by initially listing the entire Data set from the 'Category' DataSource.

The URL is demo/crawler?u=161662539950&m=n&db=playground&k=3&s=137&d=f&mm=u&a=e r#3.

The parameters that have changed are:

k=3 (key=3) which tells the system to apply the action to the record with the key '3' a=er (action='expand record') which tells the system to expand the target record ('3).

Figure 30:
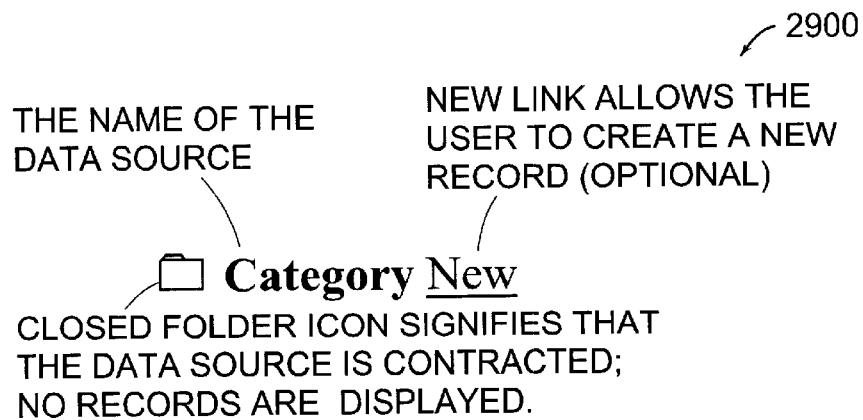

In the contracted view (FIG. 30) the Category Source has been contracted and all of the records that are available in the view are hidden.

The URL behind the view in FIG. 5 is as follows:

http://home.datafree.com/demo/crawler?u=393128299954&m=n&db=food_supply&s=137&d=f&a-es#143

The arguments in the URL are as follows:

u=393128299954 The 'u' stands for 'UserID'. The UserID is used by the Program to identify the session. The session file is the first file restored by the system. It will include the UserName that identifies the User, as well as other session information. Each user is assigned a new unique UserID whenever they begin a new session.

m=n The 'm stands for 'Mode'. There is a separate 'Mode' parameter for each different 'Program Mode'. The system has two primary Program Modes: 'n' for Navigate (Data Expander View) or 'd' for 'Display'. The current Mode is 'Navigate'. If no Mode is specified, the default is Navigate.

db=food_supply 'db' represents the 'Database' that the User is utilizing. This parameter is required and if not present the user will be switched into 'User' Mode.

s=137's' signifies the 'Source'. The value will match one of the predefined Nodes within a Database. The system will use this Source value to open the Source's Node Object configuration record. The Node contains the names of Sub-Objects to restore. When a restoration is complete, the program will have the basic information necessary to fetch the actual Data and format the output.

d=f 'd' is the symbol for 'Display'. Display pertains to the Screen Mode. The two major modes are 'f' for Full-Screen or 's' for 'Split'. The system is designed to operate in either a Full-Screen mode (no frames) or a Split-Screen view which will combine the Navigate and Edit screens together for maximum efficiency.

a=es 'a' stands for 'Action'. Action pertains to the current action that the User has initiated. Action typically pertains only to the Navigate Mode. There are four options for Action:

In the FIG. 10 view, the End-User has clicked on the 'expand' record' icon for the record sweets'.

The UserID is used by the Program to identify the session. The session file is the first file restored by the system. It will include the UserName that identifies the User, as well as other session information. Each user is assigned a new unique UserID whenever the user begins a new session.

There is a separate "Mode" parameter for each different "Program Mode". The system has two primary Program Modes: "n" for Navigate (Data Expander View) or "d" for 'Display'. The current Mode is "Navigate". If no Mode is specified, the default is Navigate.

Figure 27:
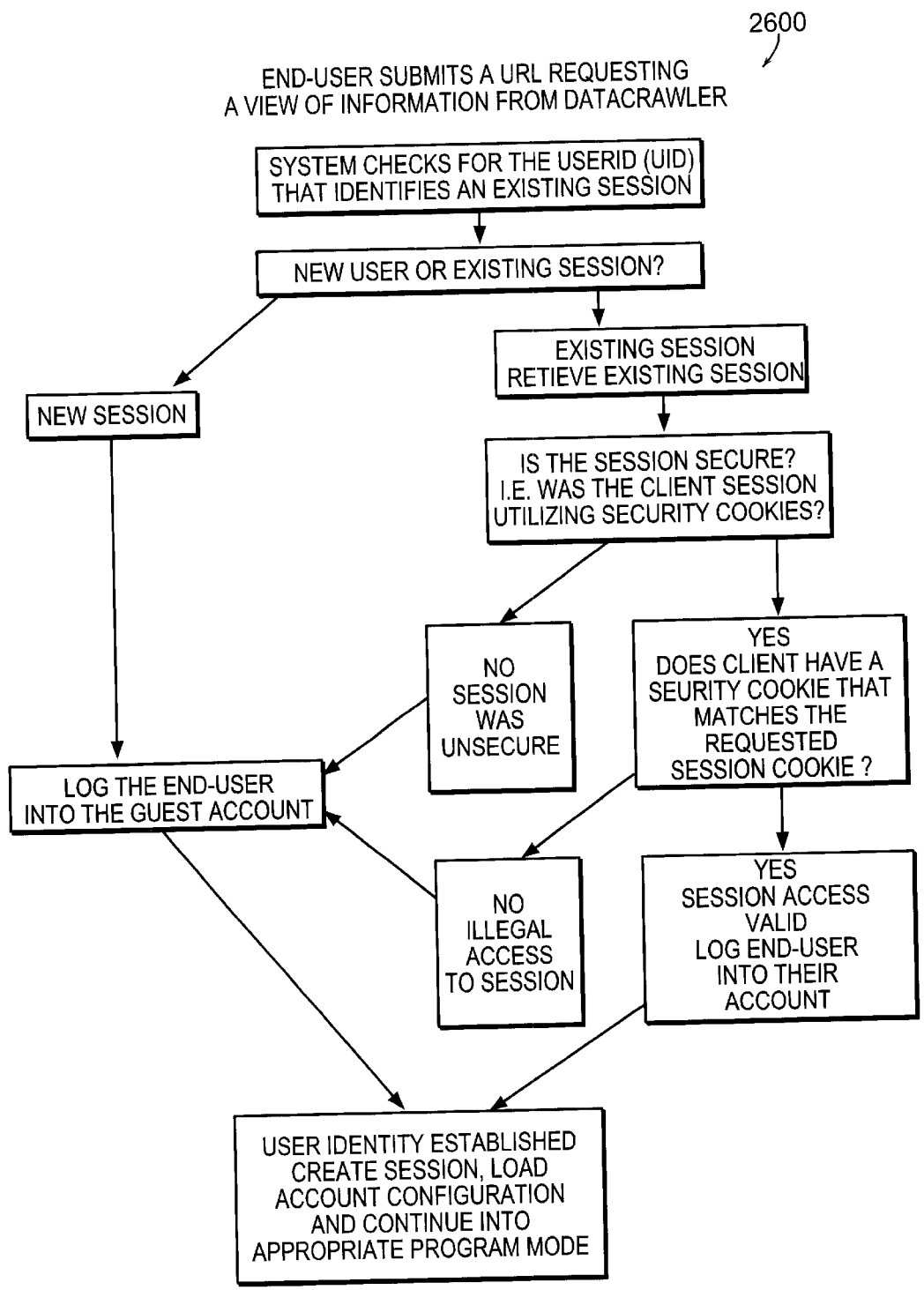

This parameter is required and if not present the user will be switched into "User" Mode (see FIG. 27).

The source value will match one of the predefined Nodes within a Database. The system will use this Source value to open the Source's Node Object configuration record. The Node contains the names of Sub-Objects to restore. When restoration is complete, the program will have the basic information necessary to fetch the actual Data and format the output.

Display pertains to the Screen Mode. The two major modes are 'f' for Full-Screen or 's' for 'Split'. The system is designed to operate in either a Full-Screen mode (no frames) or a Split-Screen view which will combine the Navigate and Edit screens together for maximum efficiency.

Action pertains to the current action that the User has initiated. Action typically pertains only to the Navigate Mode.

The parameters that have changed are:

a=cs (action='contract source') which tells the system to contract the target source ('137').

The procedure by which the DataCrawler system provides for administration will now be described. The administrator interface permits the database user to quickly set up complete web database applications. Since the DataCrawler system is already pre-built, it will simply needs to be configured to work with the data that is retrieved.

DataCrawler administration is entirely HTML-based. As such, there is nothing to download or plug-in. JavaScript and frames may be added to provide increased functionality but they are not necessary. All that is required is an HTML compliant Web browser.

The following outlines the basic steps needed for administering complete DataCrawler web database applications. As described above, the system provides many different methods of formatting and displaying information.

The tools found in the administrator start page allow one to create an entire DataCrawler application. As noted above, DataCrawler applications are based upon two basic display functions. An underlying principle of the DataCrawler system is to standardize the process of accessing and manipulating information within a database by providing a structured pre-built framework. The DataCrawler system provides a mechanism that effectively supports any format of interrelated database information regardless of its complexity.

The basis of any DataCrawler application is two screens. The first screen contains the Universal Data Explorer, a hierarchical summary listing of the current record set. From this screen the user can explore, expand and search on multiple records. This screen does not allow editing. The second screen contains the Single Record DataSource. This screen allows the inspection and/or editing of a single record of information from the Database.

The creation of an on-line DataCrawler application involves at least three steps. The first step is the creation of a DataSource with associated FieldGroups and Fields. The second is creation of a Node Application. The third step is the creation of a Menu Entry point for the Node on the End-User menu.

DataSource setup is the initial step required when creating a new DataCrawler DataSource. The DataSource is used to define the structure of each DataSource including the type, location, and necessary Keys. For SQL Data Sources, this component contains options that define the query construction at run-time such as SELECT, ORDER BY and GROUP BY. The DataSource also defines each Field and Field Group contained within the Data Source. These elements include definitions, values, data entry rules and display formatting.

As noted above, Nodes are used to build DataCrawler applications. A DataCrawler application is a collection of Node objects linked together. These linked Node applications form the essence of the DataCrawler system. A Node is the central component of any DataCrawler application. Each Node controls the functionality of one Data Source. Nodes require a link to a predefined DataSource and act as the representative of that Data Source. Notes assign templates for the Tree-View Explorer and the data entry data form which control overall formatting for these display areas. Although each Node is based on a single Data Source, Nodes may be linked together in Parent-Child fashion to create interrelated data sets.

The DataCrawler system provides an integrated menu system that is configured by the administrator. This menu is displayed in a tree-view hierarchical list, allowing effectively infinite growth and easy access. The menu system provides the user with a switchboard allowing access to all available DataCrawler applications in the current database.

The DataCrawler system is implemented to provide a secure environment for accessing database information over the Internet. The security information described below presents an overview of the procedures, options and issues involving security with the DataCrawler system.

SQL represents a standardized way of accessing databases through a common gateway interface. As described below, the DataCrawler system allows the direct manipulation of information within SQL compliant databases including reading, inserting, updating and deleting data.

The DataCrawler system has other options that one may desire to utilize. These include but are not limited to the ability to change the interface design and configure system database settings. Options are provided for configuring Tree, Form and Button Templates for advanced display control, Lookup list Functionality and system configuration.

A "DataSource Object" defines the origin of a Data Source, which includes the underlying structure as well as the format of each Field.

"DataSources" define data storage attributes, including the location, content and format of each data source used by the system. The primary definitions are data sources and the associated fields contained within. As such, DataSources define the structure and format of information to be used within the system. DataSources may be characterized as a cross between a Database TABLE/QUERY and the end-user data entry form. This is the initial required step for creating a new DataCrawler Application. There are three elements within the DataSource component:

1. The DataSource Component is responsible for managing definitives and configuration for each Data Source.
2. FieldGroups define logical ordering and grouping of Fields within the Data Entry Form.
3. Within each FieldGroup are one or more Field definitions. Fields define the structure of information within a Data Source.

The DataSource definition includes the data storage name/location, type and other options. The DataCrawler system is implemented to be data-independent. As such, it works with data stored in divergent formats. In one embodiment, DataCrawler provides support for at least two primary types of data: SQL databases and a proprietary key-value text file system.

A DataSource contains one or more FieldGroup definitions.

FieldGroups are used to control group display and formatting options for groups of Fields.

Fields also define data entry rules and display formatting. Fields may be characterized as a cross between Column definitions found in an SQL table and Fields found on an end-user data entry form. Fields also contain configuration settings for Lookups. Lookups are one or more values that are looked up from a predefined source. Lookups are typically used to fill a Select List with a list of values for the user to choose.

A Data Source object defines the type, name and location of each external source of data used within DataCrawler. Options that pertain to each data format also may be specified here.

As mentioned above, the DataCrawler system has been implemented to be data-independent. As such, it has the ability to access and manipulate information contained in various different data formats. In one embodiment, the DataCrawler system allows the developer to work with two different Data Types. The first is the default Native DataCrawler DataSource data storage. This is a simple internal proprietary file-based format that stores each record as a set of Key=Value pairs. This format is used by the system to store all configuration data. It is easy to use but provides few features and is typically not appropriate for large Data Sets. (The internal data storage format is excellent for developing and prototyping applications quickly and easily as there is no need to configure the data storage: it is automatic.) The second is the SQL Relational Database DataSource SQL data storage. This is more complex and difficult to maintain, yet contains advanced features. The system will use the settings defined here to automatically generate the proper SQL clause at run-time. Utilizing this functionality requires an understanding of SQL database objects such as Tables, Columns and Indexes. To use this format, one is required to set up and manage actual SQL tables and columns using the SQL Administrative interface. Note that it will not be necessary (or possible) to directly administrate the database: SQL administration functionality is limited, as described in the SQL Administrative documentation.

The primary "key" must be defined at the DataSource level and must be defined as a Field within a FieldGroup. The DataCrawler system will usually handle this task automatically by assigning the primary "key" as 'dc_sys_id' and creating a field by this name within the Field elements.

DataSource Administration will now be described. The first action is to decide which DataSource to use. If a new DataSource is being created, then one starts with the DataSource Native format since this is the easiest to work with. Next, using the administrator menu, one must choose expand the DataSource Administration menu item. Choose the appropriate DataSource that one wishes to create and click on the menu item hyperlink to launch the DataSource explorer.

In order to set up a Data Source, the following procedure is used. First one clicks on the New Link next to the DataSource Header. Then it is necessary to define the specific options that are available.

To explore and edit existing DataSources, the following procedure is used. From the Data Explorer view, expand the list DataSources. For single record viewing and editing, click on the hyperlink of the record you wish to see. Each DataSource has one or more Child FieldGroups objects. Click on the blue Expand icon to view the related FieldGroups for the DataSource.

FieldGroup objects will now be described. The DataCrawler system provides a method of grouping related Field objects together into an object called "FieldGroups". This helps to organize related Fields together when a record of database information is displayed. End-users will be able to quickly find and edit the information they desire. FieldGroup objects automatically include a tabbed index, caption header and Help facility.

FieldGroup objects can be managed according to the following procedure. This procedure involves initially following the procedure for managing DataSources. From the DataExplorer view, click on the Expand icon to view the related FieldGroups for the DataSource. Now click directly on the hyperlink for each appropriate FieldGroup to view and edit. Next select the New hyperlink to create a new FieldGroup, or click on the Expand icon to view the related Fields for a particular FieldGroup.

FieldGroups are used primarily for display and formatting purposes within the DataSource display of a single record of information. Each FieldGroup contains one or more Field elements. Fields define how data is structured within each DataSource.

The DataCrawler system expects to find each record of information broken into one or more fields as is found in an SQL database table. Field objects have options and settings that allow precise control over the display and formatting of each field.

Fields can be managed according to the following procedure. This procedure involves initially following the procedure for managing FieldGroups. Subsequently, from the DataExplorer view, click on the Expand icon to view the related Fields for the FieldGroup. Now click directly on the hyperlink for each appropriate Field to view and edit or select the New hyperlink to create a new Field.

After defining a Data Source, there is the need to create each field that is to be used in the DataCrawler system. The DataCrawler will automatically add certain fields to a new DataSource that will be used by the system. A Primary Key for each DataSource must be defined so that the system will be able to select and edit information. The DataCrawler system will automatically assign a Primary Key for each new DataSource. The Primary Key is typically named "dc_sys_id". The automatically defined Primary Key should not be altered. If the Data Source requires two Keys to select information, the second key must also be defined. The actual Key designations occur at the DataSource element.

Lookups allow a list of values to be displayed to the user to structure the input. Lookups can be formatted as checkboxes, radio buttons, select lists, or read-only values. Lookups are a highly integrated part of the DataCrawler system providing full featured functionality. There are three types of Lookups:

1. Lookup Lists. Lookup lists are very simple lists created and stored exclusively within the DataCrawler system. They are composed of one or more Display and Key Values.
2. Lookup Data Source. This lookup uses an existing and predefined DataCrawler DataSource as the source of the lookup.
3. Selection Source. The Selection Source provides the user with a Hierarchical Select list, and is another Node application.

The list lookup option uses the DataCrawler Native storage format (each record is a separate file containing key=value pairs). In a typical case, this type of lookup should only be used for smaller sets of information (200 or less) that will not grow much.

After the Data Source has been selected, the record must be saved. Afterwards, the Key and Display field values must be configured.

When the User clicks on the hyperlinked value, one or more DataSource field values will be set.

As mentioned above, the DataCrawler system also provides an integrated menu system that is configured by the administrator. Accordingly, a menu is displayed in a treeview hierarchical list. The menu system is simple to use. Menus are either non-action item captions or hyperlinks that launch a Node Application. There are two types of Menus available. The first is Labels which identifies a group of common menus and typically contain nested child submenus. Labels can be explored or expanded, but the captions are not hyperlinked. The second is Entry Points which allow the actual launching of a new DataCrawler application. Entry point captions are hyperlinked and take the user directly into a Node Application that has been linked by the administrator.

Creating and maintaining menus can be accomplished by the following procedure: In order to work with menus it is necessary to click the Menu Administration Component from the administrator start page. This launches the Menu configuration Node Application. The current top-level menus will be listed for editing. Click on a target menu or click the "New" link at the proper hierarchy level where the new menu is to be placed. This will display edit mode where one can enter a Label. It is necessary to select whether this menu should end the hierarchy or continue it, and attach an optional Node Application as an Entry Point.

The DataCrawler system also provides for the management and administration of Nodes, according to the following procedure. In administering Nodes, one must start from the administration menu, then expand the "Node Administration" category, and click on the appropriate Node option that it is desired to utilize.

The Node editor is slightly different from the DataSource editor, because Nodes are a "Recursive" data source in and of themselves. When working with the Node editor, it is readily seen that one can specify unlimited hierarchy, with unlimited Child Nodes at each level.

Interface Objects allow further customization and configuration of the DataCrawler interface. Elements found here include: buttons, forms, trees, and select source. Each of the objects plays a powerful role in how the application looks and feels to the end-user. In at least some cases, these objects are optional.

Buttons are used by the system to allow the user to navigate around the DataCrawler system. They are primarily used on the Form to provide user functions such a save, delete and new. Administrators may add new buttons that link to other web applications. Existing buttons also can be reconfigured for a different look and feel.

The Form object defines how the single record display is formatted as a whole. While Fields and Field Groups define the lowest level of granular detail, Forms control overall properties of the record display. The DataCrawler system provides a Default Form which, in a typical case, should not be changed. Instead, new Form objects should be created in the Form element and used as templates. In order to override the default form, it is necessary to link it to a branch application. Forms must be linked to a Branch object to become utilized by the system. After creating a new Form, it is necessary to locate the one or more target Branch Applications that will utilize it and select it from the list of available Forms. Forms are global objects and are not tied to particular databases.

Tree Objects control the display properties for the TreeView Data Navigator. Defining a Tree is optional, since the system provides a Default Tree. Trees must be linked to a Branch to become enabled. This is done by locating the desired Branch and selecting the target Tree from the list. Trees are global to all databases. It is desirable to treat Tree definitions as templates and label them with their distinct properties. Rarely is a Tree needed for just for one Branch.

Select Sources provides the user with a tree-view selection list of values to choose from. This is the same as the system Branch Application Tree-View listing of information. In fact, it is a Branch and is configured in much the same way. The difference is that the user is able to set a value in a form by clicking on a value in the list. The administrator may now provide the user with large lists of information. The lists may be broken up hierarchically or filter enabled.

A Select Source allows the End-User to choose values from a hierarchical list of selections.

User Mode is now described, and pertains to all End-User activities that occur outside of the UDE or UDE Program Modes. User Mode includes all User, session and membership configuration as well as error and security messages.

The most important aspects that the User Mode controls are system Login and security. When the End-User initially accesses DataCrawler, they are logged in under a 'Guest' account. This account only allows limited access to limited Databases. The User must create and/or Login to an account to establish a secure identity.

On each and every access the system will attempt to verify the End-User and police any database activities.

User Mode uses Login validation with a User and Password to validate the End-User's account.

Once an End-User has logged in, User Mode validates the session by storing a cookie on the client Web Browser.

If the End-User is not logged in or is not accepting security cookies, the system assigns them to the guest account which may or may not have permission to access a particular DataCrawler Database.

FIG. 27 outlines the 'silent' procedure the Program will use to establish End-User identity. When any request comes in, the system must always first establish an identity for the End-User, even if it means assigning them to the guest account.

Security aspects of the DataCrawler system will now be described. The DataCrawler system provides the ability for an Internet browser client to read, edit, insert and delete information contained within databases directly over the Internet.

The DataCrawler system is implemented to provide a secure environment for accessing database information over the Internet. The administrator is responsible for deciding upon the level of security to be used. The security configuration that the administrator decides upon can be extreme, minimal, or in between. Because the DataCrawler system is a web application that requires a Web server to interact with end-users, security includes internal and external procedures. The following discussion presents an overview of the procedures, options and issues involving security with the DataCrawler system.

The DataCrawler system utilizes two independent layers of security. The first is Internal Security. This is DataCrawler built-in security, which includes User Access with respect to configuring security and managing accessibility, and Database Access with respect to configuring security and managing accessibility. The second External Security. This involves the web server, operating system and applications, and System Configuration Files.

With respect to internal security, the DataCrawler system provides built in management of each user that enters the system. This management includes login authentication, session management, data security and cookie implementation. This process is operating system independent and is handled exclusively by the DataCrawler system. Internal security is composed of two parts. The first is User Access. Users are logged in globally within a DataCrawler system which may contain many databases. User login authorization and session management is controlled exclusively by the DataCrawler system independently of any database within the system. This means that users retain a single account regardless of the number of databases within the system, simplifying administration. Individual Database Administrators have no direct control over Users other than allowing or denying them access to a Database. The second is Database Access. Member access to a Database is controlled exclusively by the Database Administrators. The Administrators control user access via system configuration and group management. User access refers to how users enter and login to the DataCrawler system. With respect to user accounts, users are global entities within the DataCrawler system. By default, the system allows any user to create an account within the system, and Administrators have no control over user accounts outside of a database. This allows for minimized maintenance for both the user and the administrator. The user is in charge of the user's own configuration options while the administrator simply allows or denies access to a particular database. When a user logs in, the DataCrawler system validates the username and password before allowing entry. Users are able to alter account information such as username and password, as well as session configuration options. Because the DataCrawler system creates each page at the instant it is requested, each user has the ability to configure certain aspects of the interface to the user's needs.

With respect to user authentication, the DataCrawler system provides global user authentication to enforce system security. With the exception of the anonymous login activation noted below, all users requesting access to a DataCrawler application must first go through the authentication process before gaining entrance to the system.

Authentication requires the submission of a Username and Password. The system uses a proprietary and operating system independent process for validation and storage of user accounts. Actual user account information is stored within the DataCrawler system database format. The user account includes the username and password. With respect to "Anonymous" or "Guest" Login, a user account exists for "Guest" or "Anonymous" users facilitating access that bypasses the login process. All users entering the system are assigned to the guest account until after a successful login is accomplished. The Guest account is an especially desirable aspect of the DataCrawler system because it allows direct access to database information while bypassing the typical login process. Database Administrators decide how to allow access for this Guest user. By default, databases allow guest access in a read-only mode.

With respect to session management, the DataCrawler system manages each user session automatically. This functionality depends upon DataCrawler assigning a unique identifier to each new user after a successful login. This identifier is then used by the system to track the user throughout the entire application. This raises the possibility that a past or current session could be accessed by another user that determines, in some way, the exact session ID. DataCrawler attempts to make this session ID highly random, but the possibility of unauthorized session access remains. The only way to prevent this from occurring is to enable cookie session management.

Cookies prevent unauthorized session access. The DataCrawler system provides built-in and automated cookie management that can be configured by the user. When cookies are enabled, the DataCrawler system checks on each and every access to ensure that the user is the original initiator of the session. If unauthorized access is attempted to a cookie enabled session, the request will be denied and the unauthorized User will be presented with an explanation of the failure.

Cookies are important for ensuring secure single user sessions. However, typically there are some users that do not utilize cookies. The DataCrawler system allows a non-cookie user to enter the system only as the Guest account only. Non-cookie users are non-secure and will not have the ability to create accounts or otherwise login to a nonguest account. The administrator must decide whether to allow non-secure access to the database.

The DataCrawler system provides a configurable cookie timeout period, according to which the user can choose to limit the amount of time a group session will remain active before requiring a re-validation through the log in process. By default, the system will cause a time out for the user session in any case after a period of one day. This ensures that even if a privileged operator leaves the computer and forgets to log out, the session will automatically timeout and require a new login.

Database Access is controlled entirely by the one or more Database Administrators. The Administrator manages users by assigning them to UserGroups. UserGroups define permissions for a group of users within the database. The system provides configurable mechanisms that the Administrator uses to allow or deny a User entry into the database. In a specific embodiment, the only way that a user can be allowed membership is for that user to request membership.

In the DataCrawler system, UserGroups designate permissions for common groups of user. The Administrator controls each UserGroup and decides which UserGroup each user is a member of. UserGroups control data security and database privileges for the assigned Users. The administrator configures database privileges such as update, insert and delete permissions for each UserGroup. UserGroups can also be designated as Administrators. Administrators will have access to the administration interface and therefore have the ability to modify the Database.

UserGroups can be created and edited according to the following procedure. From the administration start menu, choose the Security menu item. This will display all of the current UserGroups in the system. Click the 'New' link next to the UserGroup Branch Caption to load a new blank UserGroup edit form or select an existing record. Provide a Caption to describe the UserGroup and a Start Page message. Next, check the boxes for the database privileges appropriate for this group. If this is an administrator, then this box must be checked also. Note that the administrator interface is different and works with a different set of data and that permissions still apply. Finally, determine the appropriate cookie configuration and apply it as needed.

The DataCrawler system uses a membership process to allow users entry into a database. A username is linked to a UserGroup from within the database. Whenever the user enters a database, the membership records are checked. If a record is found for that user, the user is allowed access as a member of the defined UserGroup. If a membership is not found, then the database User Access Configuration determines if and how the user is allowed to enter the Database.

There are two primary methods that a user may use to enter a DataCrawler Database. The first method is from inside the system: the user may click on a hyperlink database listing within the Database Browser. At this point, inside the system, the user is attempting access to the Database start page. A user coming from this location is likely to be logged into a DataCrawler account and is therefore a secure user. The second method is that the User may come from outside of the system from anywhere on the Web. In this case a hyperlink would typically contain a database name (db=some name) and the Node Source (s=some node_key).

There are three options for configuring access for external users that are not members. These include automatic membership, membership by request, and refuse membership.

Automatic Membership will allow any User attempting to access the Database Instant membership into the Guest account. Any privileges that apply for the Database Guest UserGroup will apply to any new user. Membership By Request will not allow a user to enter the database. Instead, the user is given membership to the Request UserGroup, which does not allow access. The Administrator must then take the action to review the request and rule whether to allow or deny membership. Refuse Membership is option that is not always available. This option refuses all membership without comment. Any user that is not a member of the database is denied access under all circumstances.

By default, a database is configured to allow instant membership to any User. In this way, the Administrator can place links that jump directly into any DataCrawler database view from any location on the web. This is a desirable consideration for the Administrator, as it opens the database up to the Internet.

The Administrator controls membership configuration through the Configuration menu item found within the Security Menu. The Administrator manages user memberships from the User Membership menu item found within the Security Menu. New requests can only be initiated by the User attempting entry into the database. That is, the Administrator cannot explicitly add a User into the database membership.

External security will now be described. External security options may be limited or unavailable if this one is using the DataCrawler system as part of a service. The DataCrawler system runs as a CGI process within a Web server. The Web server, system applications and the associated operating system combine to provide external security to the DataCrawler system. An external security component retains absolute control over which clients are allowed to access the DataCrawler system, regardless of the DataCrawler Security configuration. Options may include Web server user authentication and encrypted data transmission.

With respect to where and how the DataCrawler system stores system files, although DataCrawler system configuration files are used internally by the system, it is desirable that they be secured from unauthorized access. In some cases, all users except the Administration are denied access to these files. These files usually contain highly sensitive information including usernames and encrypted passwords. At the same time, the Web user account must have access rights or the DataCrawler system will not be able to utilize this configuration data.

Regarding how system information is stored, the DataCrawler system provides its own highly simplified database that is used to store all system information. Each record is stored as a series of KEY=VALUE pairs within a file that located inside a data source directory. The data files stored include Usernames and Passwords. The system data files are stored in the data_path directory. This path is set at installation time.

In general, the DataCrawler system information is only as secure as one makes it. If users need restricted access to the server that contains these system data files, security permissions should be applied to them. Because DataCrawler does not encrypt its system data (except passwords) or store it in a special format, it is the responsibility of the administrator to ensure that this data is secure. It is important to note that the Web server account that accesses these files must have permission to do so.

It is important not to place the system data files in an area that is read-accessible to the Web server. On many Web servers, any subdirectories of Web server accessible directories are also available. In the usual case, there is no reason for the DataCrawler system data files to be accessible directly through the Web server.

In at least some cases, the DataCrawler system relies on SQL as a standardized way of accessing databases through a common interface. The DataCrawler system allows direct administration of the objects contained within an SQL compliant database. To use existing Tables or other SQL objects within a DataCrawler application, the Administrator must create and manage an SQL DataSource.

Within the DataCrawler system, SQL Administration is composed of two parts, which are SQL Database Administration and SQL Data Type Mapping.

With respect to SQL Database Administration, the DataCrawler system automatically creates an SQL Database when required. The Administrator is required to maintain the tables, columns and indexes contained within. In a specific embodiment, SQL Database Administration allows the creation and management of SQL Tables and Columns only. Other embodiments may include support for index manipulation. In at least some cases, the management of tables, columns and indexes is the only functionality that is required. DataCrawler SQL DataSources and Fields allow extensive Query options, which helps to keep the back-end Database configuration a simple process while the application supports most functionality.

Regarding Data Type mapping, the DataCrawler system will automatically create each SQL query clause for selecting or updating database information. In order to accomplish this, the system needs to map each field's data type into one of three classifications: text, numeric, and dates. DataCrawler will then use this mapping to properly format each field in the query. "Text" is enclosed in quotes, "numeric" receives no formatting, and "dates" receives special database dependant formatting.

In at least some cases, these data types will already be set up with the default system. If the system informs one of an unidentified data type, one should classify it. To accomplish this, one should go to the "ODBC Setup" menu from the Administrator start page, and choose the "Data Type Mapping" submenu. Subsequently, one should choose "new" to add a new data type mapping if it does not already exist.

The method to accomplish this (i.e., at least a portion of one or more of the procedures described above) may be implemented in hardware or software, or a combination of both. In some cases, it is advantageous if the method is implemented in computer programs executing on programmable computers that each include a processor, a storage medium readable by the processor (including volatile and non-volatile memory and/or storage elements), at least one input device such as a keyboard, and at least one output device. Program code is applied to data entered using the input device to perform the procedure described above and to generate output information. The output information is applied to one or more output devices.

In some cases, it is advantageous if each program is implemented in a high level procedural or object-oriented programming language such as Perl, Microsoft C, or C++ to communicate with a computer system. The programs can be implemented in assembly or machine language, if desired. In any case, the language may be a compiled or interpreted language.

In some cases, it is advantageous if each such computer program is stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. As demonstrated, the DataCrawler system technology can be used to provide a complete end-to-end Database Management System. Yet another application for the DataCrawler system technology can be as a specialized tool that can be integrated into software applications and services either directly over the Internet or as part of a shrink-wrapped product. The DataCrawler system technology can be made available within any Internet site with the appearance that it is originating from that location when in fact it is situated remotely. This arrangement allows the DataCrawler system technology to be used as a programmatic Web-Based Object or Component that may be integrated within other Web applications entirely over the Internet. This technique of distribution allows the DataCrawler system technology to play a partial role as a data exploration or data entry tool in almost any Web-based application that accesses database information. Uses include administrative data management and End-User hierarchical data browsing.

The terms and expressions that are employed herein are terms or description and not of limitation. There is no intention in the use of such terms and expressions of excluding the equivalents of the feature shown or described, or portions thereof, it being recognized that various modifications are possible within the scope of the invention as claimed.

What is claimed is:

1. A method comprising:

in accordance with a definition that hierarchically links portions of a database independently of any database-provided links between the portions, applying HTML-compatible form-based information delivered via browser software to update the contents of the portions.

2. A method comprising:

in accordance with a definition that hierarchically links portions of a database independently of any database-provided links between the portions, applying HTML-compatible form-based information delivered via browser software to update the contents of the portions.

3. The method of claim 1, further comprising:

in response to an HTTP request from the browser software, dynamically tracing an interrelated path between divergent data sources.

4. The method of claim 3, further comprising:

determining, from at least one argument supplied in the request, a currently active data source.

5. The method of claim 4, wherein the currently active data source is identified with a node source.

6. The method of claim 3, further comprising:

determining, from at least one argument supplied in the request, at least one record within a node source.

7. The method of claim 3, further comprising:

determining, from at least one argument supplied in the request, an active record within a parent node data source.

8. The method of claim 3, further comprising:

determining, from at least one argument supplied in the request, a branch mode that limits the tracing.

9. The method of claim 3, further comprising:

recursively restoring each successively related ascending data source starting from an entry node.

10. The method of claim 9, further comprising:

using metadata from each successively restored node to create each branch of the hierarchy.

11. The method of claim 9, further comprising:

traversing a hierarchical path via a non-recursive node, the path being known prior to run-time and having a finite number of hierarchical relationships.

12. The method of claim 9, further comprising:

traversing a hierarchical path via a recursive node, the path being known only at run time and dependant on real-time data access and containing an undetermined number of hierarchical relationships.

13. The method of claim 3, further comprising:

restricting the path of a hierarchically linked set of data sources by ending at a selected location.

14. The method of claim 13, further comprising:

ending the tracing at a target data source located anywhere within the hierarchy.

15. The method of claim 13, further comprising:

based on an argument in the request, controlling the location of a branch in the path.

16. The method of claim 15, wherein the argument indicates a node being branched upon.

17. The method of claim 13, further comprising:

based on an argument in the request, limiting a recursive data source containing itself as a parent data source, the argument representing the key of the active record being branched upon within the hierarchical path.

18. The method of claim 3, further comprising:

deriving a display from a set of hierarchically linked data sources and the corresponding data within in a predetermined universal format.

19. The method of claim 18, further comprising:

providing a set of predetermined HTML user interfaces for user database activities including search, navigation, and editing, the set being generated by reusable program procedures.

20. The method of claim 18, further comprising:

deriving a universal display procedure for multiple records of data of a data source from a single program routine, the display providing access to search, filter, navigation, list, export, and report features.

21. The method of claim 18, further comprising:

deriving a universal display procedure for a single record of data of a data source from a single program routine, the display providing access to detail and edit features.

22. The method of claim 1, further comprising:

applying a reusable HTML-based service to reduce resources consumed in providing a Web application that relies on the database.

23. The method of claim 1, further comprising:

using a pre-built application framework to interact with the database, the framework having reusable HTML components; and using the reusable HTML components in multiple applications for display and interaction;

wherein each application has corresponding configuration settings that define an execution path to be taken at runtime, excepting custom event functions that extend the framework.

24. The method of claim 1, further comprising:

by a centralized definition data model for storing metadata, allowing extension of an application interacting with the database without changing an existing application structure;

wherein the metadata is stored in a distributed arrangement and an update to the centralized data model provides a new feature in the distributed arrangement.

25. The method of claim 1, further comprising:

providing a configured hierarchical selection tool for selecting predefined values in data entry.

26. Computer software, residing on a computer-readable storage medium, comprising a set of instructions for use in a computer system, the instructions causing the system to:

in accordance with a definition that hierarchically links portions of a database independently of any database-provided links between the portions, apply HTML-compatible form-based information delivered via browser software to update the contents of the portions.

27. A system comprising:

an applier applying, in accordance with a definition that hierarchically links portions of a database independently of any database-provided links between the portions, HTML-compatible form-based information delivered via browser software to update the contents of the portions.

* * * * *